United States Patent
Go et al.

(10) Patent No.: US 11,951,515 B2
(45) Date of Patent: Apr. 9, 2024

(54) TECHNIQUES FOR DEPOWDERING ADDITIVELY FABRICATED PARTS VIA GAS FLOW AND RELATED SYSTEMS AND METHODS

(71) Applicant: Desktop Metal, Inc., Burlington, MA (US)

(72) Inventors: Jamison Go, Orlando, FL (US); Michael Santorella, Boston, MA (US); Jonah Samuel Myerberg, Lexington, MA (US); Matthew McCambridge, Burlington, MA (US); Alexander LeGendre, Boston, MA (US); Joseph Gabay, Somerville, MA (US); Robert J. Nick, Pepperell, MA (US); Michael Goldblatt, Lincoln, MA (US)

(73) Assignee: Desktop Metal, Inc., Burlington, MA (US)

( * ) Notice: Subject to any disclaimer, the term of this patent is extended or adjusted under 35 U.S.C. 154(b) by 349 days.

(21) Appl. No.: 16/983,138

(22) Filed: Aug. 3, 2020

(65) Prior Publication Data

US 2021/0046519 A1    Feb. 18, 2021

Related U.S. Application Data

(60) Provisional application No. 62/882,703, filed on Aug. 5, 2019.

(51) Int. Cl.
*B08B 5/02* (2006.01)
*B22F 1/10* (2022.01)
(Continued)

(52) U.S. Cl.
CPC .................. *B08B 5/02* (2013.01); *B22F 1/10* (2022.01); *B22F 3/1017* (2013.01); *B33Y 40/20* (2020.01); *B33Y 10/00* (2014.12); *B33Y 30/00* (2014.12)

(58) Field of Classification Search
CPC .. B08B 5/02; B22F 1/10; B22F 3/1017; B22F 10/68; B33Y 10/00; B33Y 30/00; B33Y 40/00; B33Y 40/20; B29C 65/35
See application file for complete search history.

(56) References Cited

U.S. PATENT DOCUMENTS

| 5,658,412 A | 8/1997 | Retallick et al. |
| 6,932,935 B1 * | 8/2005 | Oberhofer .............. B33Y 30/00 425/375 |

(Continued)

FOREIGN PATENT DOCUMENTS

| EP | 3 434 448 A1 | 1/2019 |
| KR | 20160028907 A | 3/2016 |

OTHER PUBLICATIONS

U.S. Appl. No. 16/269,713, filed Feb. 7, 2019, Jordan.
(Continued)

*Primary Examiner* — Ricardo D Morales
(74) *Attorney, Agent, or Firm* — Wolf, Greenfield & Sacks, P.C.

(57) ABSTRACT

Techniques for depowdering in additive fabrication are provided. According to some aspects, techniques are provided that separate powder from parts by directing gas onto, or near to, the powder. While fragile green parts, such as green parts produced by binder jetting, may be fragile with respect to scraping or impacts, such parts may nonetheless be resistance to damage from directed gas, even if directed at a high pressure. Techniques for depowdering through directed application of gas may be automated, thereby (Continued)

mitigating challenges associated with manual depowdering operations.

14 Claims, 24 Drawing Sheets

(51) Int. Cl.
| | |
|---|---|
| *B22F 3/10* | (2006.01) |
| *B33Y 10/00* | (2015.01) |
| *B33Y 30/00* | (2015.01) |
| *B33Y 40/20* | (2020.01) |

(56) References Cited

U.S. PATENT DOCUMENTS

| | | | |
|---|---|---|---|
| 8,545,209 | B2 | 10/2013 | Shi et al. |
| 9,887,356 | B2 | 2/2018 | McAlpine et al. |
| 10,377,061 | B2 | 8/2019 | Wolfgang et al. |
| 10,406,751 | B2 | 9/2019 | Fulop et al. |
| 10,500,789 | B2 | 12/2019 | Fulop et al. |
| 11,207,733 | B2 | 12/2021 | Pourcher et al. |
| 11,491,720 | B2 | 11/2022 | Jordan |
| 2001/0045678 | A1 | 11/2001 | Kubo et al. |
| 2002/0090410 | A1 | 7/2002 | Tochimoto et al. |
| 2004/0003738 | A1 | 1/2004 | Imiolek et al. |
| 2004/0084814 | A1 | 5/2004 | Boyd et al. |
| 2005/0001356 | A1 | 1/2005 | Tochimoto et al. |
| 2008/0060330 | A1* | 3/2008 | Davidson ............... B33Y 40/20 55/529 |
| 2009/0211616 | A1 | 8/2009 | Tafoya |
| 2009/0255912 | A1 | 10/2009 | Dietrich |
| 2009/0283119 | A1 | 11/2009 | Moussa et al. |
| 2011/0186081 | A1 | 8/2011 | Dunn et al. |
| 2011/0300248 | A1 | 12/2011 | Tung et al. |
| 2013/0026680 | A1 | 1/2013 | Ederer et al. |
| 2013/0052291 | A1* | 2/2013 | Morikawa ............... B33Y 40/20 425/135 |
| 2013/0075957 | A1 | 3/2013 | Swanson et al. |
| 2013/0241095 | A1 | 9/2013 | Korten et al. |
| 2013/0244040 | A1 | 9/2013 | Oshima |
| 2014/0141961 | A1 | 5/2014 | Koszo et al. |
| 2015/0258744 | A1 | 9/2015 | Muller et al. |
| 2015/0314389 | A1* | 11/2015 | Yamada ................. B33Y 10/00 219/76.1 |
| 2016/0200053 | A1 | 7/2016 | Chen et al. |
| 2016/0263827 | A1 | 9/2016 | Fripp et al. |
| 2016/0318253 | A1 | 11/2016 | Barnhart |
| 2016/0325507 | A1 | 11/2016 | Chu et al. |
| 2016/0368224 | A1 | 12/2016 | Ooba et al. |
| 2017/0071707 | A1 | 3/2017 | Uckelmann et al. |
| 2017/0144874 | A1 | 5/2017 | Huebinger et al. |
| 2017/0239893 | A1 | 8/2017 | Hoover et al. |
| 2017/0297097 | A1 | 10/2017 | Gibson et al. |
| 2017/0348910 | A1 | 12/2017 | Hutchinson |
| 2018/0133968 | A1 | 5/2018 | Zeulner |
| 2018/0193887 | A1 | 7/2018 | Pourcher et al. |
| 2018/0297114 | A1 | 10/2018 | Preston et al. |
| 2018/0297284 | A1 | 10/2018 | Fulop et al. |
| 2018/0305266 | A1 | 10/2018 | Gibson et al. |
| 2018/0307209 | A1 | 10/2018 | Chin et al. |
| 2018/0370213 | A1 | 12/2018 | Gold et al. |
| 2019/0022942 | A1 | 1/2019 | Fulop et al. |
| 2019/0030810 | A1 | 1/2019 | Gasso et al. |
| 2019/0039367 | A1 | 2/2019 | Roman et al. |
| 2019/0076924 | A1 | 3/2019 | Jepeal et al. |
| 2019/0084229 | A1 | 3/2019 | Gunther |
| 2019/0143597 | A1 | 5/2019 | Huang et al. |
| 2019/0160537 | A1 | 5/2019 | Hofmann |
| 2019/0240913 | A1 | 8/2019 | Jordan |
| 2021/0008808 | A1 | 1/2021 | Cudzilo et al. |
| 2021/0053121 | A1 | 2/2021 | Go et al. |
| 2021/0237159 | A1 | 8/2021 | Go et al. |

OTHER PUBLICATIONS

U.S. Appl. No. 16/989,149, filed Aug. 10, 2020, Go et al..
U.S. Appl. No. 17/117,200, filed Dec. 10, 2020, Go et al..
PCT/US2018/027611, Aug 29, 2018, International Search Report and Written Opinion.
PCT/US2018/027611, Oct. 24, 2019, International Preliminary Report on Patentability.
PCT/US2019/016967, May 6, 2019, International Search Report and Written Opinion.
PCT/US2019/016967, Aug. 20, 2020, International Preliminary Report on Patentability.
International Search Report and Written Opinion dated Aug. 29, 2018 in connection with International Application No. for PCT/US2018/027611.
International Preliminary Report on Patentability dated Oct. 24, 2019 in connection with International Application No. PCT/US2018/027611.
International Search Report and Written Opinion dated May 6, 2019 in connection with International Application No. PCT/US2019/016967.
International Preliminary Report on Patentability dated Aug. 20, 2020 in connection with International Application No. PCT/US2019/016967.

* cited by examiner

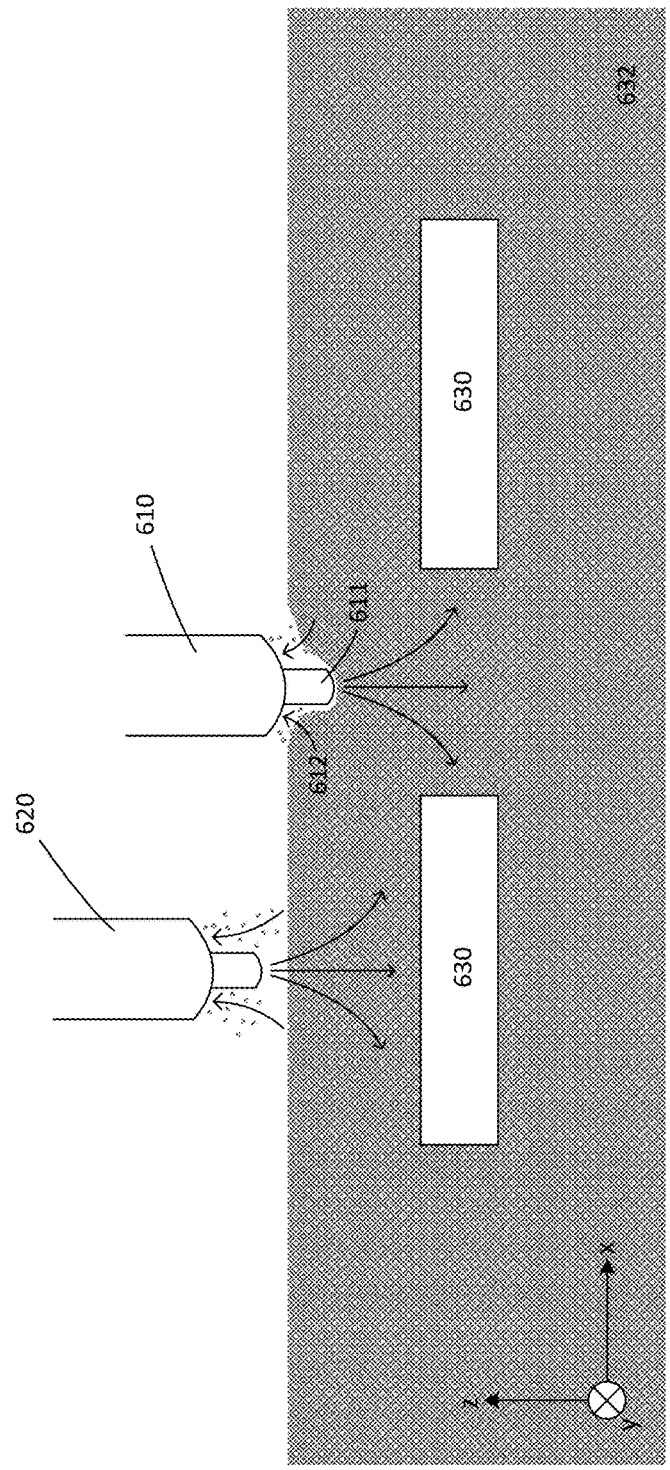

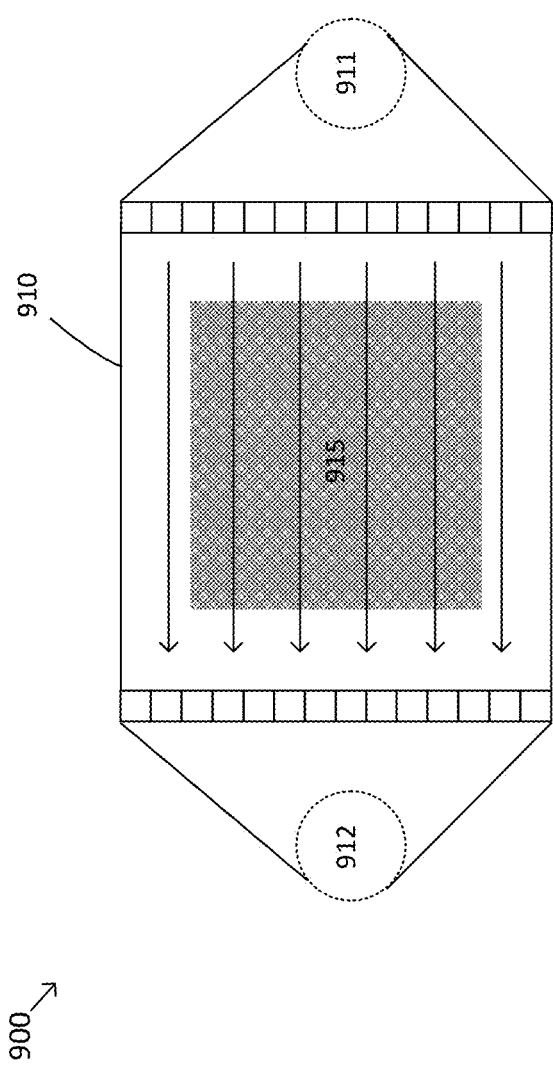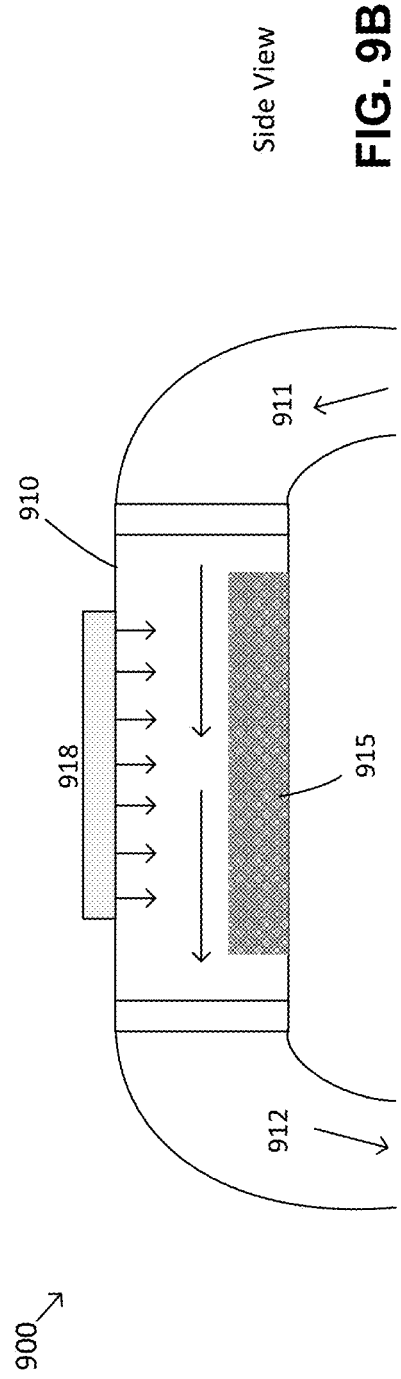

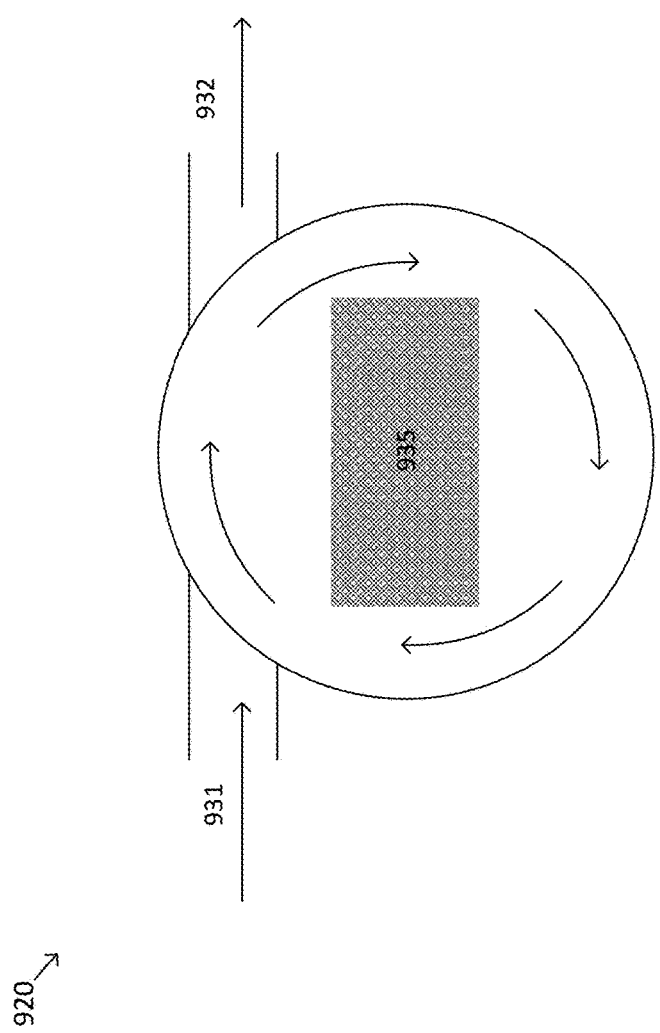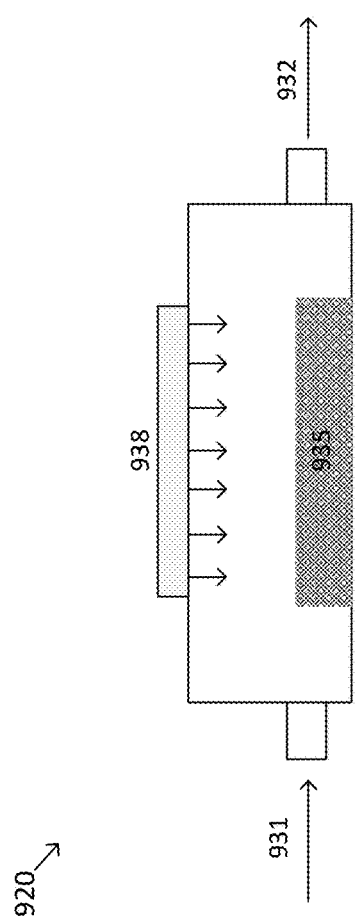

Top View

Side View

Top View

Side View

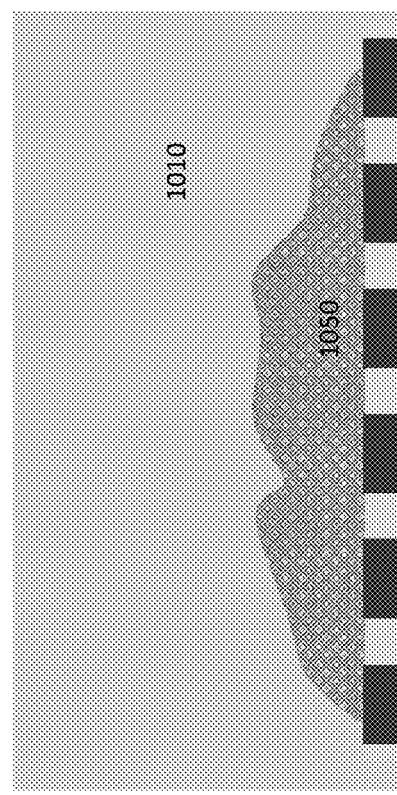
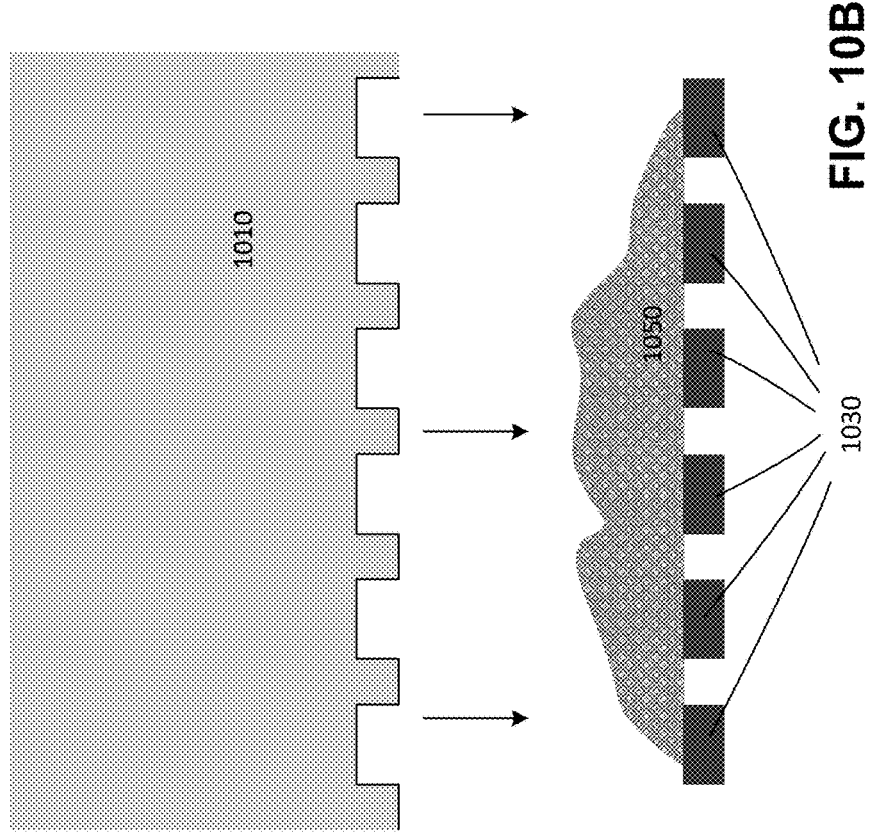
FIG. 10C
FIG. 10B

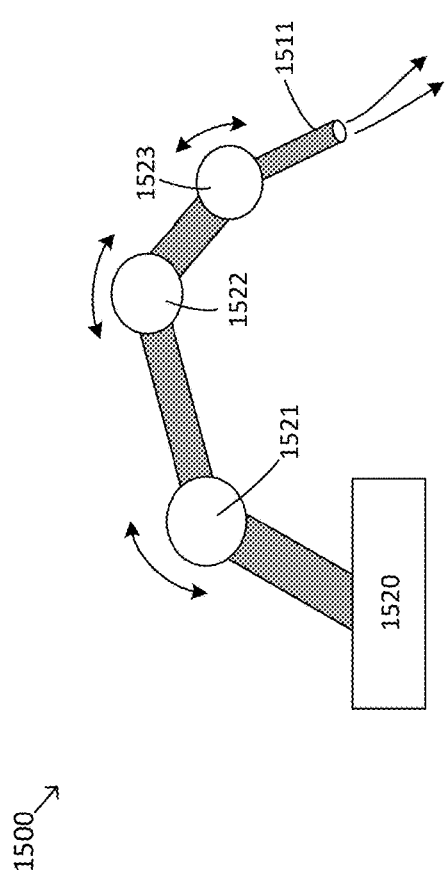
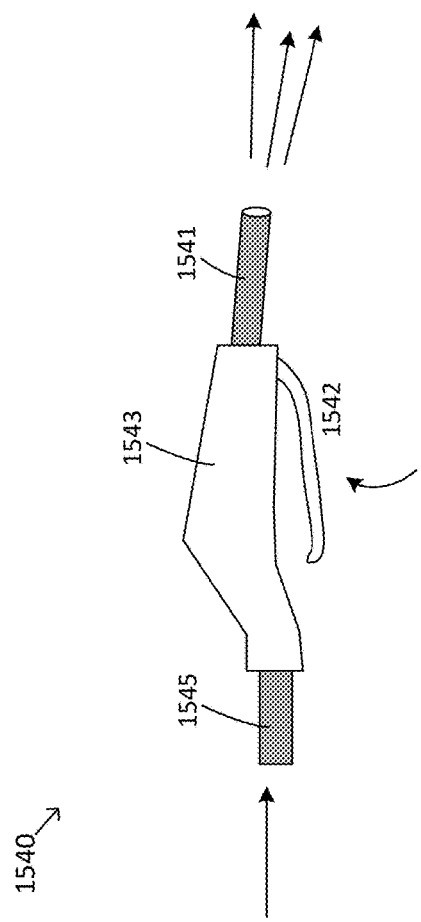
FIG. 15A
FIG. 15B

TECHNIQUES FOR DEPOWDERING ADDITIVELY FABRICATED PARTS VIA GAS FLOW AND RELATED SYSTEMS AND METHODS

CROSS REFERENCE TO RELATED APPLICATIONS

The present application claims the benefit under 35 U.S.C. § 119(e) of U.S. Provisional Application No. 62/882,703, filed Aug. 5, 2019, which is hereby incorporated by reference in its entirety.

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, parts may be fabricated by combining portions of a powder or other granular material to create fully dense parts. For example, additive fabrication techniques known as binder jetting may selectively apply a liquid to portions of a layer of powder, then a subsequent layer of powder may be deposited over the first layer, and additional liquid applied to additional portions of the new layer, and so on. At the end of such a process, the parts are disposed within a volume of the powder from which the parts must be separated.

SUMMARY

According to some aspects, a method is provided for extracting one or more additively fabricated parts from a powder bed comprising a powder and the one or more additively fabricated parts, the method comprising inserting at least part of the powder bed into a chamber, the chamber comprising one or more inlets and one or more outlets, forming a hermetic seal around the at least part of the powder bed, directing, using one or more nozzles, one or more jets of gas onto a surface of the powder bed within the chamber, and producing, concurrently with said directing the one or more jets of gas onto the surface of the powder, a continuous flow of gas through the chamber from the one or more inlets to the one or more outlets such that powder from the powder bed is transported through at least some of the one or more outlets.

According to some aspects, an apparatus is provided for extracting one or more additively fabricated parts from a powder bed comprising a powder and the one or more additively fabricated parts, the apparatus comprising a chamber configured to receive a build box containing the powder bed and configured to form a hermetic seal around at least part of the build box such that a surface of the powder bed may be exposed within the chamber, the chamber comprising one or more nozzles each configured to direct a jet of gas onto the surface of the powder bed, one or more inlets, one or more outlets, and at least one pressure source coupled to the one or more inlets and/or to the one or more outlets and configured to create a pressure differential between the one or more inlets and the one or more outlets.

According to some aspects, a method is provided of removing powder from one or more surfaces of an additively fabricated part, the method comprising directing a plurality of solid particles onto the one or more surfaces of the additively fabricated part, the additively fabricated part comprising bound metal powder and having unbound metal powder on its surface, such that collisions between the solid particles and the one or more surfaces dislodge at least some of the unbound metal powder from the surface of the additively fabricated part, and at least some of the dislodged metal powder is carried away from the additively fabricated part by gas produced through sublimation of the solid particles.

According to some aspects, an apparatus is provided for removing powder from one or more surfaces of an additively fabricated part comprising bound metal powder and having unbound metal powder on its surface, the apparatus comprising a mounting structure configured to hold the additively fabricated part, one or more nozzles configured to receive a source material and to emit the source material in a mixture of gaseous and solid states onto one or more surfaces of the additively fabricated part.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 6A depicts a depowdering system comprising two combination nozzle and vacuum devices, according to some embodiments;

FIGS. 9A-9H depict various illustrative chamber geometries that may be utilized as a chamber in the depowdering system of FIG. 7;

FIGS. 10A-10C depict a depowdering system configured to produce gas flow within a chamber that forms a seal around a plurality of belts, according to some embodiments;

FIG. 15A depicts a robotic control system coupled to a nozzle in a depowdering system, according to some embodiments;

FIG. 15B depicts a handheld device comprising a nozzle for a depowdering system, according to some embodiments.

DETAILED DESCRIPTION

Figure 1:
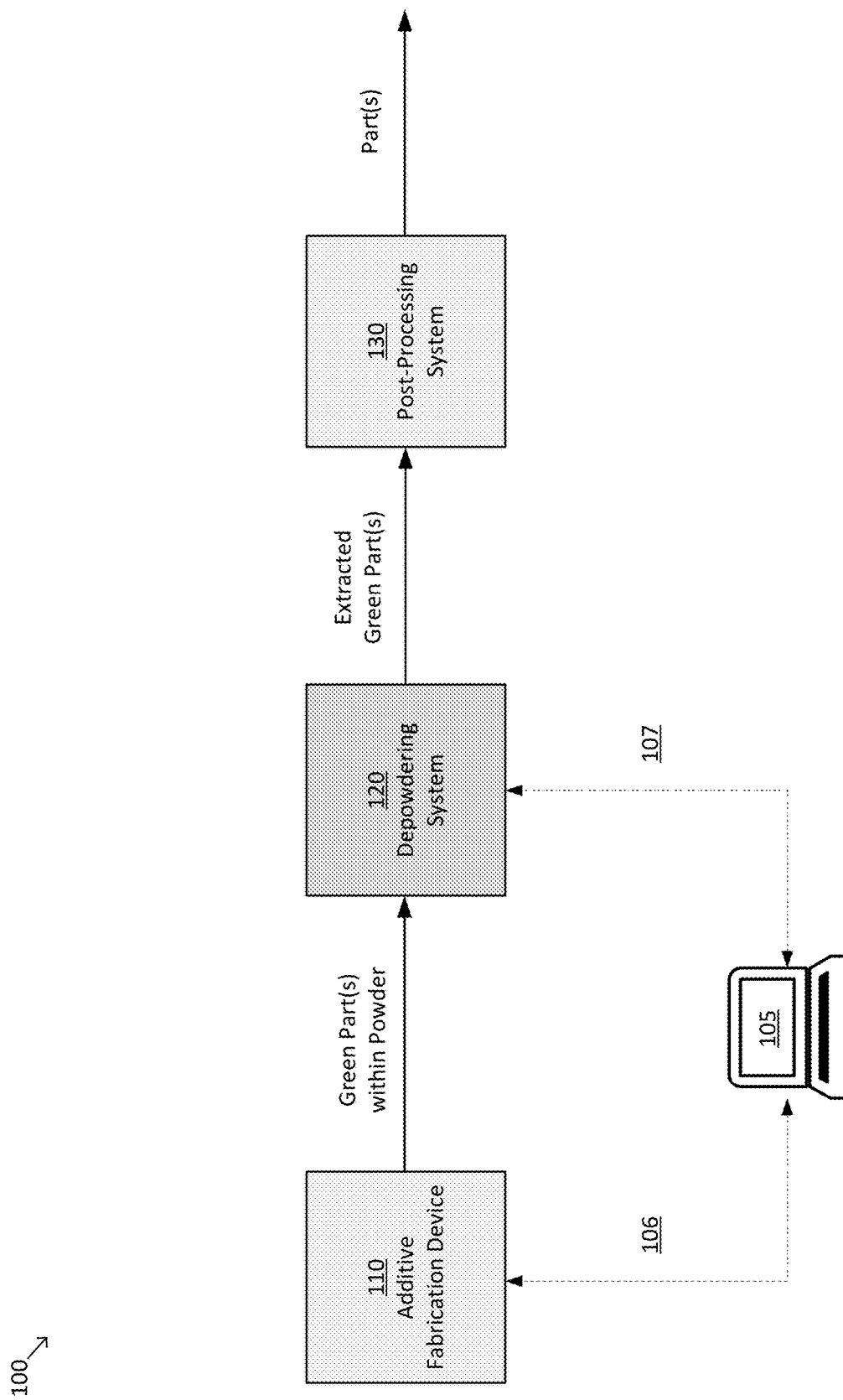
FIG. 1 is a block diagram of an additive fabrication system that includes a depowdering sub-system, according to some embodiments.

As discussed above, some additive manufacturing techniques fabricate parts from and within a granular material such as a powder. One example is binder jetting, in which parts are formed by applying a liquid (e.g., a binder) to regions of successive layers of powder, thereby producing parts (which are 'bound' regions of the powder) within a volume of unbound powder. Such parts are often referred to as "green" parts since they must undergo subsequent processing, such as sintering, to produce a final part. Other illustrative additive fabrication techniques that fabricate parts from a powder include direct laser melting, direct metal laser sintering, or selective laser sintering, in which regions of successive layers of a material (e.g., metal, nylon) are melted through application of directed energy.

Irrespective of how parts are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

Depowdering is frequently a laborious process due to the fine nature of the powder. Handling of the powder may cause a great deal of mess and, depending on the powder material, may also present safety concerns due to inhalation or flammability. Typically, depowdering is performed in a manual process of excavation that utilizes vacuum hoses and brushes to separate the parts from the powder. This process can take a great deal of time and in cases where the parts are fragile, can result in damage to the parts during excavation. Moreover, many powders used for additive fabrication, such as metal and/or ceramic powders, may exhibit low flowability which makes moving particles of the powder difficult due to the tendency of the powder to "clump" rather than flow away from the additively fabricated parts.

While, as discussed above, there are multiple additive fabrication technologies for which depowdering is performed, the process of depowdering may not be equally straightforward for each of these technologies. For instance, direct laser melting may produce metal parts during additive fabrication so that, prior to depowdering, the parts are embedded within a metal powder. Since the parts are solid metal, there is typically not a significant risk of damage to the parts during depowdering and so a wide range of simple techniques may be effective at separating the parts from the powder. In contrast, green parts produced in binder jetting comprise regions of bound powder held together by a liquid and may be considerably more fragile than parts produced by direct laser melting. Consequently, depowdering approaches that are effective for direct laser melting or selective laser sintering may not be suitable for parts produced through binder jetting since they may cause damage to the parts.

The inventors have recognized and appreciated techniques for depowdering that separate powder from parts by directing gas onto, or near to, the powder. The approaches described herein generally mobilize the powder and separate it from the parts by utilizing the fact that powder is lighter and more movable than the parts embedded within it. While some green parts, such as green parts produced by binder jetting, may be fragile with respect to scraping or impacts, such parts may nonetheless be resistant to damage from directed gas, even if directed at a high pressure. Many of the techniques described herein for depowdering through directed application of gas may be automated, as discussed further below, thereby mitigating the above-described challenges associated with manual depowdering operations.

According to some embodiments, techniques described herein for depowdering parts through directed application of gas may be applied by a depowdering system that is separate from an additive fabrication device that fabricated the parts. This approach may provide advantages for throughput, since it may allow for an additive fabrication device to begin fabricating a second group of parts while a first group of parts is being depowdered. Moreover, in use cases in which additive fabrication takes more or less time than the subsequent depowdering step, multiple additive fabrication devices and/or depowdering systems may be employed to minimize downtime of the additive fabrication device(s) and depowdering system(s). For instance, in a simple case where additive fabrication takes half as long as depowdering, two depowdering systems could be operated in parallel so that the additive fabrication device and the two depowdering systems could be operated continuously to maximize throughput.

According to some embodiments, a depowdering system as described herein may be configured to receive a build box from an additive fabrication device and to perform depowdering on contents of the build box. As referred to herein, a "build box" includes any structure in which parts may be fabricated within a powder by an additive fabrication device, and that may be removed from the additive fabrication device subsequent to fabrication. In some embodiments, a depowdering system may be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering the subsection, metering another subsection, etc.

Irrespective of how a depowdering system may be configured to operate upon the contents of a build box, the depowdering system may be configured with a receptacle sized for the build box such that the build box can be removably mounted or otherwise removably attached to the depowdering system. Subsequent to depowdering, a build box may be removed from the depowdering system and reused for fabrication. At this stage in the process, the build box may, for instance, be empty or may contain only powder, depending on the particular type of depowdering operations performed as discussed below.

According to some embodiments, a depowdering system may comprise one or more nozzles configured to direct a stream of gas onto a powder and one or more sources of suction, such as vacuums. The nozzle(s) may dislodge, aerate and/or otherwise increase the flowability of regions of the powder, thereby improving the ability of the source(s) of suction to remove powder from said regions. As discussed above, many powders used for additive fabrication, such as metal and/or ceramic powders, may exhibit low flowability which makes moving particles of the powder difficult due to the tendency of the powder to "clump" rather than flow away from the additively fabricated parts. Similarly, such powders may resist separation when a source of suction is directed onto them. A depowdering system that includes one or more nozzles for directing a stream of gas onto the powder may, however, introduce gaps between particles of the powder sufficient to mitigate or overcome this resistance, leading to more ease in suctioning away the powder.

According to some embodiments, one or more nozzles configured to direct a stream of gas onto a powder may be co-located with one or more sources of suction so that both the nozzle(s) and the source(s) of suction are operating on the same region of powder. For instance, a nozzle and a source of suction may be adjacent to one another and configured to direct gas and provide suction to the same location via, for example, an angled nozzle and/or vacuum tube.

According to some embodiments, one or more nozzles configured to direct a stream of gas onto a powder and one or more sources of suction may be automatically controlled by a suitable robotic system, which may for instance include a gantry, one or more robotic arms, etc. In some embodiments, individual nozzles or sources of suction, or groups of nozzles and/or sources of suction, may be separately movable to desired locations so that powder may be removed from multiple regions of powder simultaneously. Instructions to automatically operate such a system may be generated in advance of depowdering and may be based upon known locations of parts within the powder as discussed further below.

According to some embodiments, a depowdering system may comprise a chamber with one or more inlets and one or more outlets that may be moved over a portion of powder so as to create a seal around the powder. A flow of gas may be produced within the chamber by creating a pressure differential across inlets and outlets of the chamber, thereby causing powder to be extracted from the chamber while leaving the parts within the chamber. In some use cases, the seal may be created around a build box so that portions of powder are removed from the build box through the one or more outlets of the chambers. In some use cases, the seal may be created around another structure onto which powder and parts have been deposited.

According to some embodiments, a depowdering system may comprise a chamber that includes one or more nozzles for directing a flow of gas into the chamber. As described above, a nozzle may dislodge, aerate and/or otherwise increase the flowability of regions of the powder, thereby improving the ability of the gas flowing through the chamber to carry away powder.

The above illustrative embodiments are examples of techniques in which depowdering operations are applied to parts embedded within powder. Generally, subsequent to excavation of such parts additional powder may still be adhered to the surface and additional depowdering may be necessary to produce a completely clean part. These two different types of depowdering are referred to herein as "coarse" and "fine" depowdering, wherein "coarse" depowdering broadly refers to excavating parts from powder and "fine" depowdering broadly refers to removing comparatively small amounts of powder from the surface of an excavated part. It will be appreciated that, the use of these terms notwithstanding, depowdering operations need not be rigidly categorized into purely coarse or purely fine depowdering operations. As such, these terms are used merely to aid description of the types of effects that may be produced by the techniques described herein, and should not be viewed as limiting.

According to some embodiments, a depowdering system may comprise a source of solid particles that may be directed at speed onto a part to dislodge surface powder from the part (as per the above, this may be considered an example of fine depowdering). In some cases, the solid particles may comprise a material that evaporates or sublimates at an ambient temperature (e.g., room temperature). The stream of solid particles may thereby collide with powder on the surface of a part, thereby dislodging powder from the part, and may additionally produce gas that carries away dislodged powder. One example of a suitable material is solid $CO_2$ (dry ice).

Following below are more detailed descriptions of various concepts related to, and embodiments of, techniques for depowdering additively fabricated parts via gas flow. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an additive fabrication system that includes a depowdering sub-system, according to some embodiments. System 100 includes an additive fabrication device 110, a depowdering system 120, a post-processing system 130 and computing device 105. System 100 may, for instance, represent the production pipeline for an additive fabrication technology in which parts are fabricated from a powder, examples of which may include binder jetting, direct metal laser sintering, direct laser melting or selective laser sintering. In general, any number of each of additive fabrication device 110, depowdering system 120 and post-processing system 130 may be included in such a pipeline, although a single instance of each will be discussed in relation to FIG. 1 for simplicity. As discussed above, a system that includes multiple devices at a given stage in the pipeline may provide for increased throughput by minimizing downtime of the devices in the pipeline.

In the example of FIG. 1, the additive fabrication device 110 may be configured to fabricate three-dimensional parts from one or more source materials. In particular, the additive fabrication device 110 may be configured to fabricate the parts from a powder or other granular source material. According to some embodiments, the source material may include a metal powder and/or a ceramic powder. Depending on the particular embodiment, a source material may for instance comprise a pure metal powder, a metal alloy powder, an intermetallic compound powder, one or more powder compounds containing at least one metallic element, and/or one or more ceramic powders. In some embodiments, the source material comprises pre-alloyed atomized metallic powders, a water or gas atomized powder, a mixture of a master alloy powder and an elemental powder, a mixture of elemental powders selected to form a desired microstructure upon the interaction of the elemental species (e.g., reaction and/or interdiffusion) during a post-processing step (e.g., sintering), one or more ceramic powders, and/or any other suitable materials. In some instances, the source material may comprise a sinterable powder, and/or the source material may be compatible with an infiltration process. Moreover, the source material may contain such wetting agents, flow improvers, coatings, and other powder modifications found to be useful in the sintering or infiltration of additively fabricated parts. Accordingly, it should be understood that the current disclosure is not limited to any particular material and/or combination of materials comprising the source material, nor is the current disclosure is limited to any particular type of additive manufacturing process.

As one non-limiting example of a suitable additive fabrication device 110, the additive fabrication device may include a material deposition mechanism which be operated to deposit source material onto a powder, and a print head which may be controlled to move across the powder to deliver liquid such as a binder onto the powder. In some cases, an additional device such as a roller may be operated to move over the deposited source material to spread the source material evenly over the surface. The print head may include one or more orifices through which a liquid (e.g., a binder) can be delivered from the print head to each layer of the source material. In certain embodiments, the print head can include one or more piezoelectric elements, and each piezoelectric element may be associated with a respective orifice and, in use, each piezoelectric element can be selectively actuated such that displacement of the piezoelectric element can expel liquid from the respective orifice.

In this illustrative embodiment of the additive fabrication device 110, the print head may be controlled (e.g., by computing device 105) to deliver liquid such as a binder onto a powder in predetermined two-dimensional patterns, with each pattern corresponding to a respective layer of a three-dimensional part. In this manner, the delivery of the binder may perform a printing operation in which the source material in each respective layer of the three-dimensional part is selectively joined along the predetermined two-dimensional layers. After each layer of the part is formed as described above, the platform may be moved down and a new layer of powder deposited, binder again applied to the new powder, etc. until the part has been formed.

In the example of FIG. 1, parts produced by the additive fabrication device 110 may be referred to as "green" parts since they must undergo subsequent processing to produce a final part. Moreover, the parts produced by the additive fabrication device 110 may be contained within a volume of powder or other granular material, necessitating their extraction by the depowdering system 120. Various embodiments of the depowdering system (and/or elements of the depowdering system 120) are discussed further below.

Post-processing system 130 may include one or more devices suitable for transforming an extracted green part into a final part, which may include one or more debinding devices and/or furnaces. In systems employing a binder jetting process, extracted green parts can undergo one or more debinding processes in the post-processing system 130 to remove all or a portion of the binder system from the parts. As such, post-processing system 130 may include a thermal debinding device, a supercritical fluid debinding device, a catalytic debinding device, a solvent debinding device, or combinations thereof. In some embodiments, post-processing system 130 may include a furnace. Extracted green parts may undergo sintering in the furnace such that particles of the powder (or other granular material) combine with one another to form a finished part. In some embodiments, a furnace may be configured to perform one or more debinding processes within the furnace while extracted green parts undergo sintering.

According to some embodiments, the production of parts by system 100 may be partially or fully automated. In particular, the system may be configured to move parts embedded within powder from the additive fabrication device 110 to the depowdering system 120, and/or may be configured to move parts from the depowdering system 120 to the post-processing system 130. Automated motion may comprise one or more robotics system and/or conveyor belts, which may be configured to move parts (or parts embedded within powder) between devices in system 100, which may include motion between the three stages 110, 120 and 130 depicted in FIG. 1 and/or may be configured to move parts internally to one of the stages (e.g., moving parts between two depowdering devices of depowdering system 120). Automated motion may include automated removal of a build box from a device and/or insertion of a build box into a device. For instance, in some embodiments a build box may be automatically removed from the additive fabrication device 110 and automatically moved to, and inserted into, a component of depowdering system 120.

In some embodiments, the additive fabrication device 110 may fabricate parts within a build box, which may be automatically transferred from the additive fabrication device to the depowdering system 120. Depowdering system 120 may, as discussed above, be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering it, metering another subsection, etc.

According to some embodiments, automated movement as described above may be controlled by computing device 105. In the example of FIG. 1, computing device 105 is provided as an illustrative example of a suitable controller that may be configured to control various automated operations of the additive fabrication device 110 and/or depowdering system 120. However, it will be appreciated that system 100 may also be operated by multiple separate computing devices, including standalone computing devices and/or computing devices installed within the additive fabrication device 110, depowdering system 120 or post-processing system 130. Such computing devices may or may not be coupled to one another. As such, it will be appreciated that the below discussion of the various computational tasks that computing device 105 may be configured to perform need not be implemented using a single computing device as shown, but could be implemented on any number of different computing devices, which may be located within, or separate from, any of the elements of system 100. In particular, some computational tasks may be implemented by one such computing device but not another so that different computing devices may be configured to perform different functions from one another.

According to some embodiments, computing device 105 may be configured to generate two-dimensional layers that may each comprise sections of an object. Instructions may then be generated from this layer data to be provided to additive fabrication device 110 that, when executed by the device, fabricates the layers and thereby fabricates the object. Such instructions may be communicated via a communication link 106, which may comprise any suitable wired and/or wireless communications connection. In some embodiments, a single housing may hold the computing device 105 and additive fabrication device 110 such that the link 106 is an internal link connecting two modules within the housing of the device.

According to some embodiments, computing device 105 may be configured to receive, access, or otherwise obtain instructions generated to cause the additive fabrication device 110 to fabricate one or more parts, and may execute said instructions, thereby causing the additive fabrication device to fabricate the one or more parts. For instance, the instructions may control one or more motors of the additive fabrication device 110 to move components of the device to deposit powder, deposit liquid binder onto a layer of the powder, etc.

According to some embodiments, computing device 105 may be configured to generate instructions that, when executed by the depowdering system 120, automatically performs depowdering operations, examples of which are described below. Such instructions may be communicated via a communication link 107, which may comprise any suitable wired and/or wireless communications connection. In some embodiments, a single housing may hold the computing device 105 and depowdering system 120 such that the link 107 is an internal link connecting two modules within the housing of a device of the system.

In some embodiments, instructions to be executed by the depowdering system 120 may be generated based on the geometry of parts to be fabricated (or that were fabricated) by the additive fabrication device 120. As discussed further below, certain depowdering techniques may be based on, or may be improved by, removing powder from locations having a known relative location to parts within the powder. In some cases, instructions to be executed by the depowdering system 120 may be generated based on the locations of parts within the powder bed of the additive fabrication device 110 (or the expected locations after fabrication). As such, instructions to cause the additive fabrication device 110 to fabricate one or more parts may be generated by the computing device 105 as part of the same operation in which instructions are generated to be executed by the depowdering system 120. For example, computing device 105 may perform computational operations to arrange one or more parts to be fabricated within a three-dimensional volume representing the build volume of the additive fabrication device. The computing device 105 may then perform slicing of the parts in the volume and generate instructions for the additive fabrication device 110 to form successive layers of the parts, and in addition, may also generate instructions to be executed by the depowdering system based on the location and geometry of the parts within the volume.

As discussed above, a depowdering system may be perform depowdering on contents of a build box, either by directly depowdering parts within the build box while the parts are largely contained within the build box, or by metering contents of the build box into or onto an apparatus within the depowdering system. As examples of these two types of approaches, FIGS. 2A-2E depict illustrative operations that may be performed by a depowdering system to prepare the contents of a build box for depowdering operations, according to some embodiments.

In each of the examples of FIG. 2A-2E, some portion of a mixture of powder and parts is prepared for one or more depowdering operations. A mixture of powder and parts so prepared may be referred to herein as a "powder bed," irrespective of whether the mixture represents the entire contents of a build box or some subset of the contents of a build box, and irrespective of whether the mixture is held or supported by the build box or has been removed entirely from the build box. Accordingly, techniques described below as being applied to a powder bed may be understood as being applicable to any mixture of powder and parts, including but not limited to the various results of the operations of FIGS. 2A-2E.

Figure 2A:
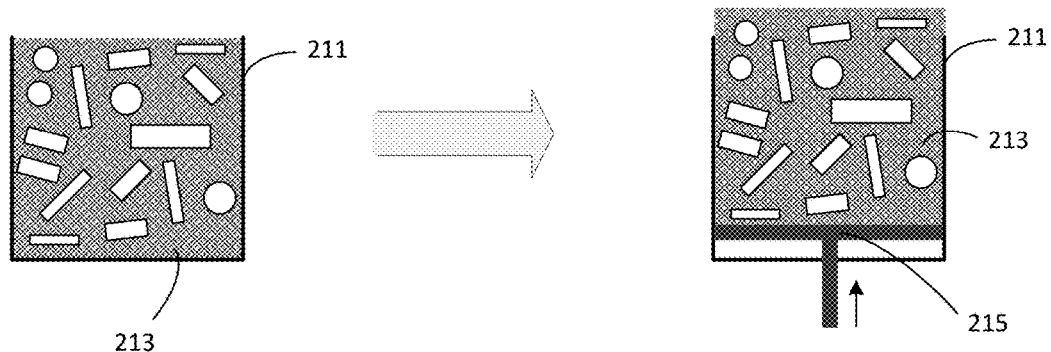
FIGS. 2A-2E depict illustrative operations that may be performed by a depowdering system to prepare the contents of a build box for depowdering operations, according to some embodiments.

In the example of FIG. 2A, a build box 211 initially comprises a mixture of powder and parts 213. Subsequently, a bottom surface of the build box is pushed upward by a delivery mechanism 215, which causes an upper section of the mixture of powder and parts 213 to be pushed beyond the upper edges of the build box. According to some embodiments, the build box 211 may comprise a plate arranged over the bottom of the build box onto which the powder and parts may be deposited. The delivery mechanism 215 may then engage with the plate and push it upwards within the build box. Alternatively, the bottom of the build box may be movable and the delivery mechanism 215 may engage with the bottom of the box and push it upwards.

Figure 2B:
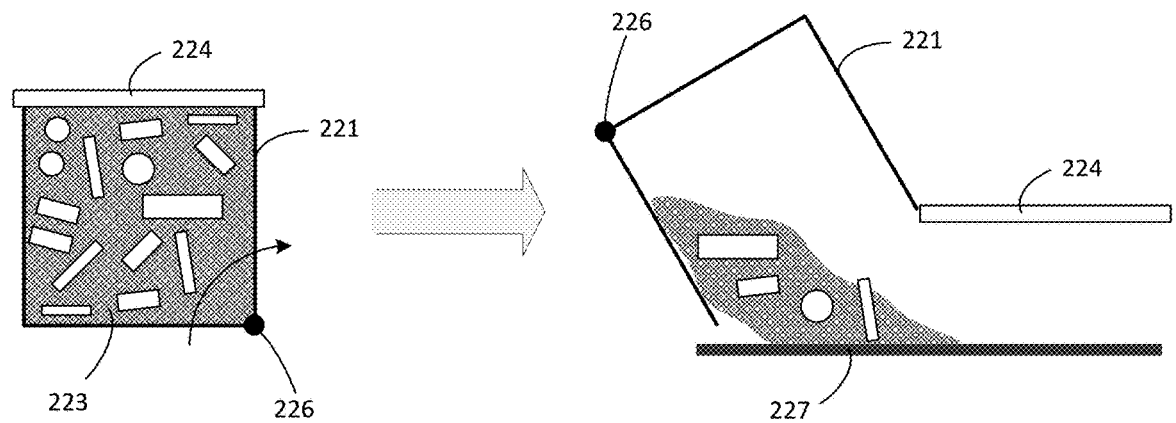

In the example of FIG. 2B, a build box 221 initially comprises a mixture of powder and parts 223 and has a cover 224 over the contents of the build box. Subsequently, the build box may be rotated around axis 226 and the lid may be automatically opened, thereby spilling contents of the build box 221 onto a desired surface 227.

Figure 2C:
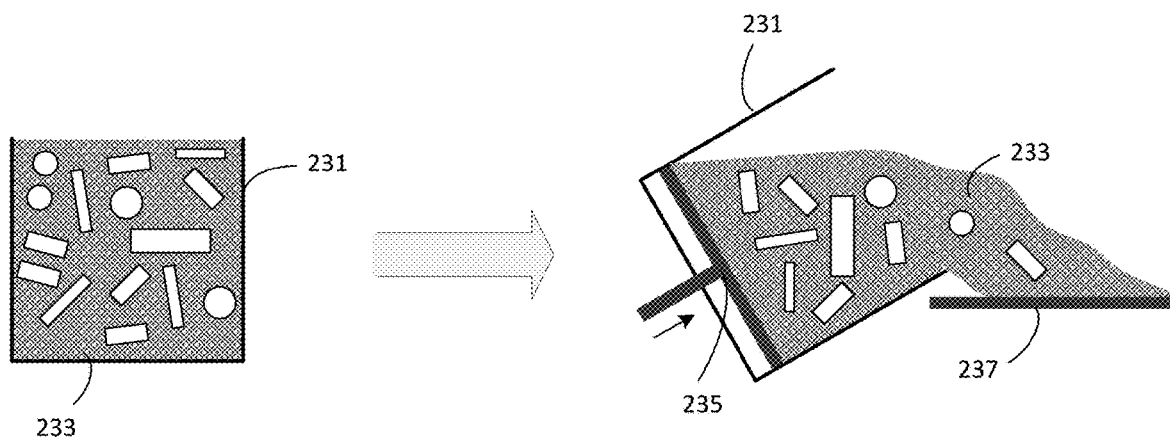

In the example of FIG. 2C, a build box 231 initially comprises a mixture of powder and parts 233. Subsequently, a bottom surface of the build box is pushed upward by a delivery mechanism 235, which causes an upper section of the mixture of powder and parts 233 to be pushed beyond the upper edges of the build box. Simultaneously, the build box is rotated, the combination of which cause contents of the build box to spill onto a desired surface 237. According to some embodiments, the build box 231 may comprise a plate arranged over the bottom of the build box onto which the powder and parts may be deposited. The delivery mechanism 235 may then engage with the plate and push it upwards within the build box. Alternatively, the bottom of the build box may be movable and the delivery mechanism 235 may engage with the bottom of the box and push it upwards.

Figure 2D:
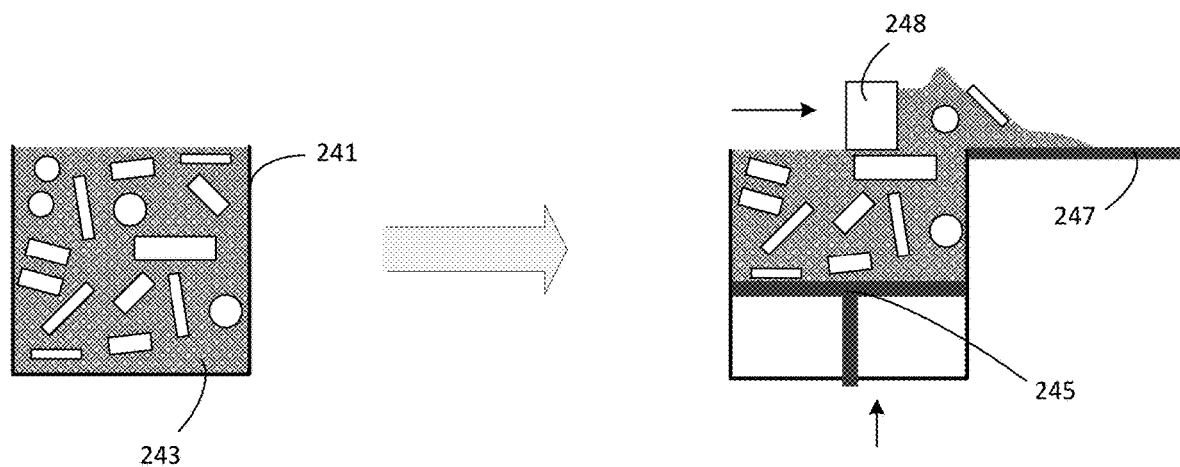

In the example of FIG. 2D, a build box 241 initially comprises a mixture of powder and parts 243. Subsequently, a bottom surface of the build box is pushed upward by a delivery mechanism 245, which causes an upper section of the mixture of powder and parts 243 to be exposed above the upper edges of the build box. Simultaneously or subsequently, a scraper 248 is moved over the surface of the build box, pushing the exposed powder and/or parts onto an adjacent surface 247. The scraper may for instance be wider than the box build and coupled to one or more actuators configured to move the scraper over the opening of the build box. According to some embodiments, the build box 241 may comprise a plate arranged over the bottom of the build box onto which the powder and parts may be deposited. The delivery mechanism 245 may then engage with the plate and push it upwards within the build box. Alternatively, the bottom of the build box may be movable and the delivery mechanism 245 may engage with the bottom of the box and push it upwards.

Figure 2E:
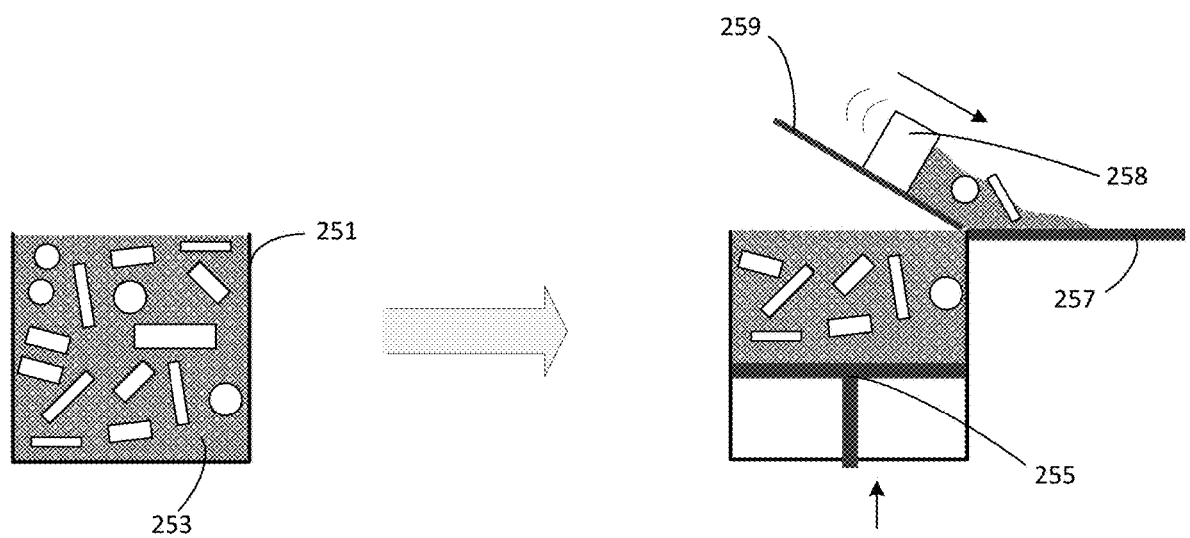

In the example of FIG. 2E, a build box 251 initially comprises a mixture of powder and parts 253. Subsequently, a bottom surface of the build box is pushed upward by a delivery mechanism 245, which causes an upper section of the mixture of powder and parts 243 to be exposed above the upper edges of the build box. Simultaneously or subsequently, a plate 259 is inserted into the exposed mixture of powder and parts and raised to incline the mixture on the plate 259. Simultaneously with insertion or inclination of the plate 259, or subsequently, scraper 258 is moved along the plate 259 to push the separated portion of the mixture 253 onto surface 257. In some cases, the plate 259 may be vibrated to aid the mixture of powder and parts to slide down the include onto surface 257. According to some embodiments, the build box 251 may comprise a plate arranged over the bottom of the build box onto which the powder and parts may be deposited. The delivery mechanism 255 may then engage with the plate and push it upwards within the build box. Alternatively, the bottom of the build box may be movable and the delivery mechanism 255 may engage with the bottom of the box and push it upwards.

In each of the examples of FIGS. 2A-2E, where components are described above as being moved, said motion may comprise, in each individual case, any combination of manual and/or automated motion. Automated motion may include execution of instructions by a suitable computing device to operate one or more components of the depowdering system 120, such as one or more actuators, to produce motion and/or may include motion produced by a user manually interacting with the depowdering system 120 (e.g., presses a button), which then automatically operates the one or more components of the depowdering system 120 to produce motion.

Figure 3B:
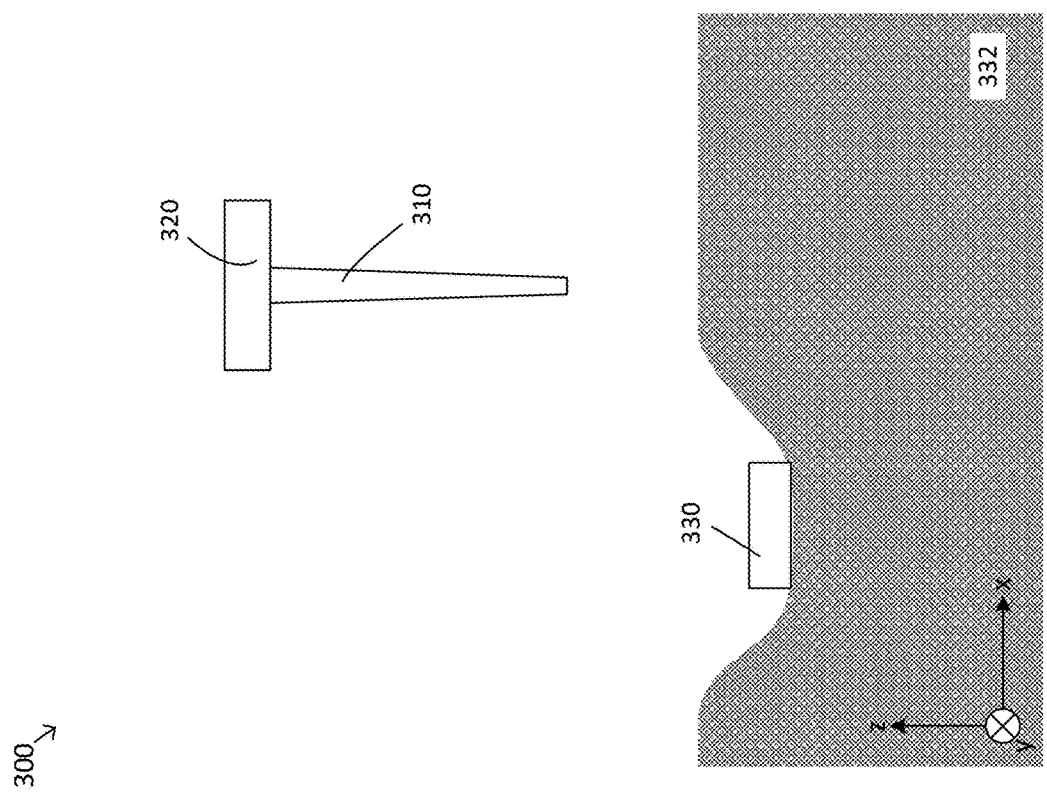
FIGS. 3A-3B depict a depowdering system comprising a nozzle configured to direct a stream of gas onto a powder and a source of suction, according to some embodiments.
Figure 3A:
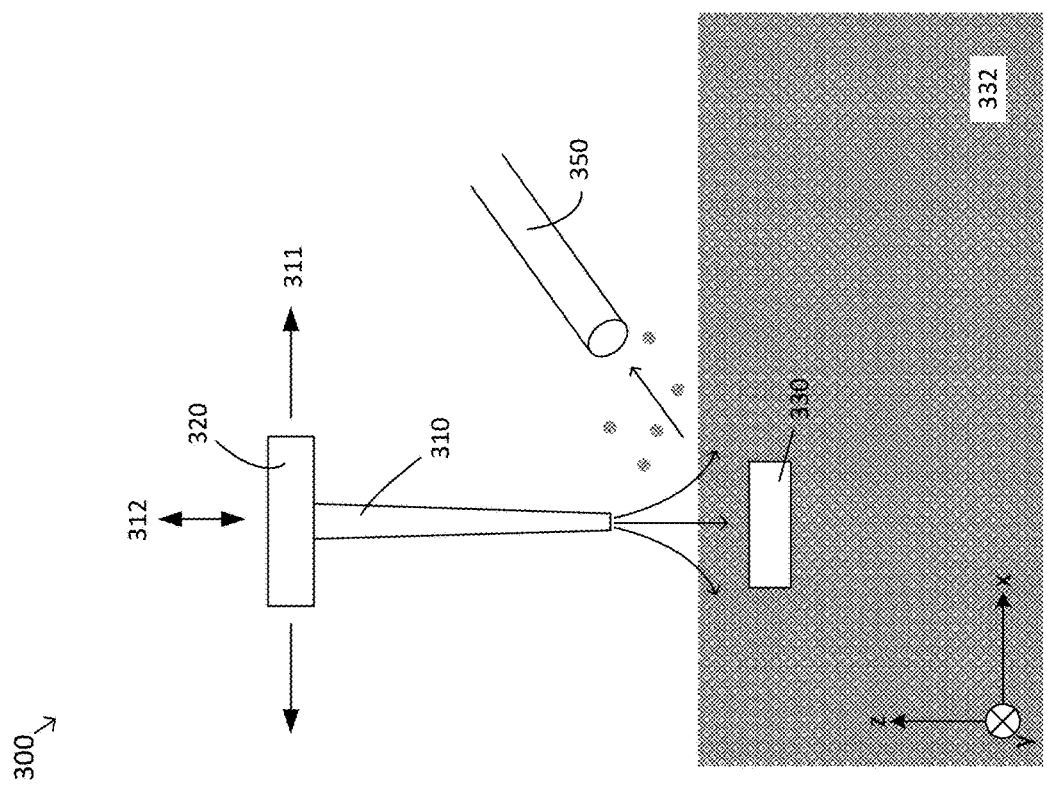

FIGS. 3A-3B depict a depowdering system comprising a nozzle configured to direct a stream of gas onto a powder and a source of suction, according to some embodiments. In the example of FIGS. 3A-3B, depowdering system 300 includes a nozzle 310 arranged on an automated gantry (of which a portion 320 is illustrated), thereby providing for automated motion of the nozzle 310 along the depicted x-axis 311 and z-axis 312. An illustrative part 330 is embedded within powder bed 332. System 300 also includes a vacuum 350 as the source of suction.

In the example of FIGS. 3A-3B, the nozzle 310 is configured to output a high-velocity stream of gas (e.g., air) onto a surface region of the powder bed 332 while vacuum 350 applies suction to the same surface region. The net result of these simultaneous operations may be to aerate or otherwise dislodge particles of the powder bed which are then removed by the vacuum 350. As discussed above, fine powders may "clump" rather than flow easily, such that particles of the powder may resist separation when a source of low pressure such as vacuum 350 is applied to them. This clumping behavior may be the result of numerous interparticle forces, such as electrostatic interactions, capillary effects, physical interlocking of particles in the powder, tacky coatings which may be present on some particles in the powder, and so on. The gas produced by nozzle 310 may introduce a separation between particles sufficient to overcome such forces, thereby allowing the vacuum 350 to more easily remove particles from the powder bed.

In the example of FIGS. 3A-3B, the nozzle 310 and vacuum 350 may each be coupled to a suitable source of pressure, such as a source of pressurized gas or a vacuum pump, respectively. According to some embodiments, one or move valves or other pressure regulators may be provided between the nozzle or vacuum and an associated pressure source, and which may be automatically controlled by depowdering system 300. For instance, the depowdering system 300 may operate a pressure regulator coupled between the nozzle or vacuum and a pressure source to activate or deactivate the nozzle or vacuum, to adjust the magnitude of the pressure produced by the nozzle or vacuum, etc. According to some embodiments, nozzle 310 and vacuum 350 may be activated and deactivated automatically to aid in excavation of parts from the powder bed.

According to some embodiments, depowdering system 300 may comprise multiple nozzles 310 and/or multiple vacuums 350. The nozzles and vacuums may be arranged and operated in any suitable way, including by operating pairs of a nozzle and a vacuum together, or by operating individual nozzles and vacuums independently. The number of nozzles in depowdering system 300 need not be equal to the number of vacuums in the system.

According to some embodiments, the nozzle 310 and vacuum 350 may each be individually controllable by depowdering system 300. In some cases, the depowdering system 300 may automatically direct nozzle 310 to locations of the powder bed based on known locations of parts within the powder bed. For instance, in the case of the powder bed being a portion of a build box, the depowdering system may operate the nozzle 310 by executing instructions that control motion of the nozzle and that were generated based on known locations of the parts within the build box.

According to some embodiments, the nozzle 310 and vacuum 350 may be automatically controlled at least in part based on feedback obtained during removal of powder from the powder bed. As one example, depowdering system 300 may include a computer vision system configured to identify parts or other features of the powder bed as powder is removed from the powder bed. The nozzle and/or vacuum may then be directed to particular locations on the powder bed based on information obtained by the computer vision system.

As shown in FIG. 3B, subsequent to removal of powder around the part 330, the part may be exposed in the powder bed and may be removed from the powder bed through any suitable means, which may include manual retrieval by a user and/or automated retrieval by an automated system such as a robotic arm.

Figure 4A:
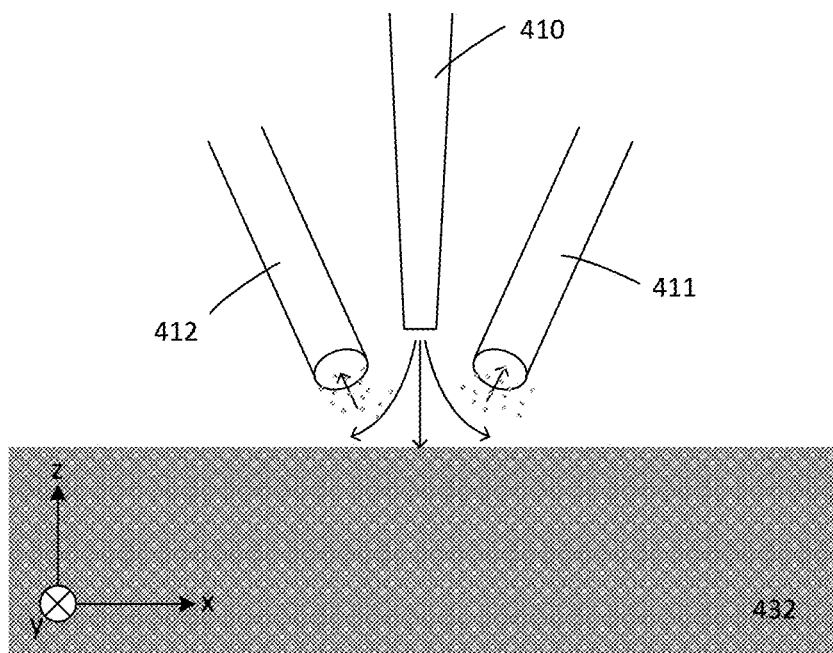
FIG. 4A depicts a depowdering system comprising a nozzle configured to direct a stream of gas onto a powder and two proximate sources of suction, according to some embodiments.

FIG. 4A depicts a depowdering system comprising a nozzle configured to direct a stream of gas onto a powder and two proximate sources of suction, according to some embodiments. In the example of FIG. 4A, a nozzle 410 is arranged in proximity to two vacuums 411 and 412. In some cases, the nozzle and vacuums may be attached to a common structure, such as an automated gantry or robotic arm, which may be operated to move the nozzle and vacuums around over the surface of powder bed 432 as a collective unit. In some embodiments, the nozzle and vacuums may be attached to a common structure which provides independent motion of the nozzle 410, the vacuum 411 and/or the vacuum 412 in addition to collective motion of the nozzle and vacuums. For example, the nozzle 410, the vacuum 411 and/or the vacuum 412 may be coupled to an actuator configured to move one of elements 410, 411 and 412 independently of the other two elements.

Figure 4B:
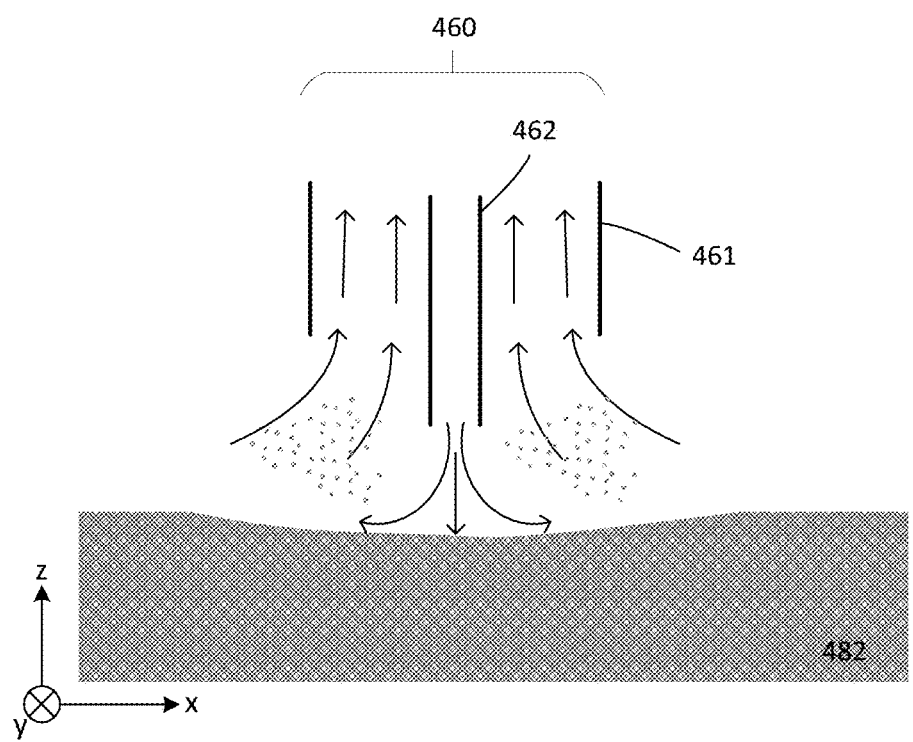
FIG. 4B depicts a cross-sectional view of a depowdering system comprising a nozzle coaxially arranged within a source of suction, according to some embodiments.

FIG. 4B depicts a cross-sectional view of a depowdering system comprising a nozzle coaxially arranged within a source of suction, according to some embodiments. In the example of FIG. 4B, a combination nozzle and vacuum 460, shown in cross-section, includes an outer structure 461 which houses a vacuum and houses an inner structure 462, which conveys a stream of gas onto the surface of powder bed 482. The combination nozzle and vacuum 460 could be implemented, for example, with a pair of concentric tubes wherein the central tube supplies a stream of gas out of the device and the outer tube is a vacuum. The combination nozzle and vacuum 460 is an example of an arrangement in which the vacuum is placed in an effective position for removing aerated powder from the powder bed by being directly next to the nozzle.

Figure 5:
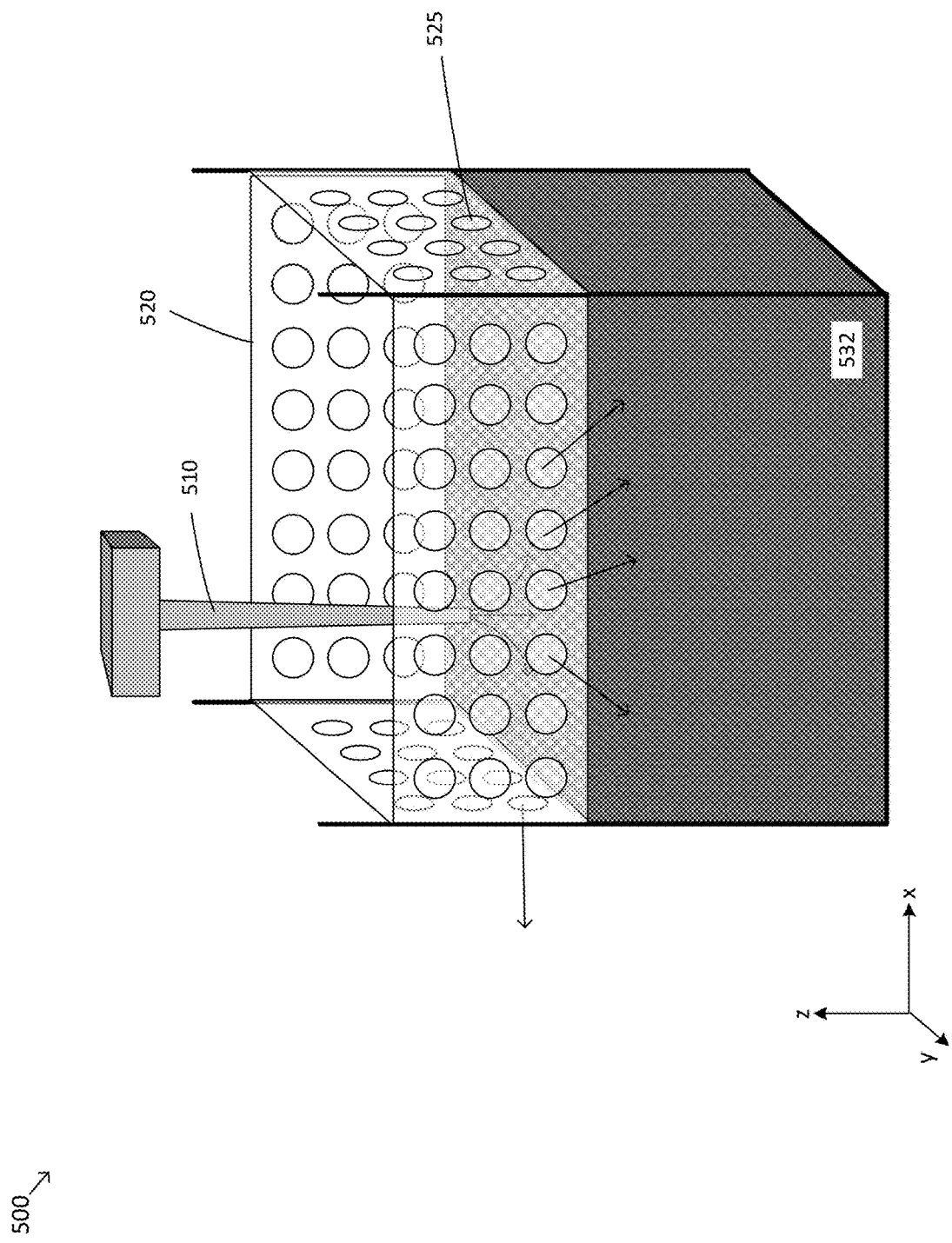
FIG. 5 depicts a perspective view of a depowdering system that comprises a vacuum system around the periphery of the powder bed, according to some embodiments.

FIG. 5 depicts a perspective view of a depowdering system that comprises a vacuum system around the periphery of the powder bed, according to some embodiments. Depowdering system 500 includes a nozzle 510, which is configured to supply a stream of gas (e.g., air) onto the surface of powder bed 532, thereby aerating and dislodging particles of the powder. According to some embodiments, the nozzle 510 may be attached to a gantry or any other suitable motion system suitable for conveying the nozzle over the surface of the powder bed 532.

In the example of FIG. 5, the nozzle and powder are contained within a chamber 520, an upper section of which comprises apertures 525. In addition, an ambient vacuum is positioned around the periphery of the chamber so that dislodged powder within the chamber may be sucked out of the chamber through any of the apertures 525.

According to some embodiments, the ambient vacuum may be implemented as one or more sources of propelled gas, such as one or more blowers. For instance, one or more blowers may be coupled to an enclosure around the chamber, thereby pulling gas through the apertures in all the faces of the chamber. In the example of FIG. 5, the ambient vacuum may be produced around some or all the apertures 525, or may be produced around a greater portion of the exterior of the chamber 520, as the illustrative example of FIG. 5 is not limited by any particular location at which the vacuum is produced so long as powder may be removed from within the chamber by the vacuum. While depowdering system 500 may comprise one or more sources of low pressure coupled to the space around the chamber 520, such sources are not depicted in FIG. 5 for clarity.

According to some embodiments, the chamber 520 may be a build box. As discussed above, a build box may be installed within an additive fabrication device and parts fabricated within the build box, which may then be transferred to a depowdering system for automated removal of powder from the build box. In the example of FIG. 5, the chamber 520 may represent an inverted build box configured with apertures through its surface. That is, the build box may be installed within the additive fabrication device with a platform installed above the apertures, which are arranged at the bottom side of the build box. Powder is deposited and parts are fabricated on top of the platform, and the build box is then transferred to the depowdering system in a vertically inverted position so that the apertures are now arranged at the top side of the build box. A lid or other surface may be placed on top of the build box prior to inversion to ensure the powder and parts remain in the same relative locations before and after inversion. Subsequently the platform on which the powder was deposited in the additive fabrication device may be removed, and depowdering performed on the exposed surface of the powder bed (e.g., while being pushed upward as in the example of FIG. 2A).

FIG. 6A depicts a depowdering system comprising two combination nozzle and vacuum devices, according to some embodiments. Depowdering system 600 comprises two instances 610 and 620 of the combination nozzle and vacuum 460 shown in FIG. 4B. The cross-sectional view of FIG. 6A does not, unlike FIG. 4B, show a cross-section through the combination nozzle and vacuum devices, but rather shows their exterior. For instance, combination nozzle and vacuum device 610 includes an inner nozzle 611 configured to produce a stream of gas onto the powder bed 632, and an outer vacuum 612 configured to remove powder from the powder bed. Parts 630 are embedded within the powder bed.

As shown in the example of FIG. 6A, multiple devices may simultaneously be applied to a single powder bed to remove powder. The devices 610 and 620 may be independently controlled to remove powder from desired locations, strategies for which are discussed above in relation to FIGS. 3A-3B. As may be seen from FIG. 6A, devices may be configured to move towards and away from the powder bed such that they may be independently controlled to operate at different depths (different z-heights) within (or near to) the powder bed. In some implementations, the devices 610 may be coupled to a common gantry so that they may be automatically moved over the surface of the powder bed together, but may be independently adjusted to different depths with respect to the powder bed. As such, each device in the gantry may be coupled to one or more independent actuators configured to move the device in the depth direction (along the z-axis).

Figure 6B:
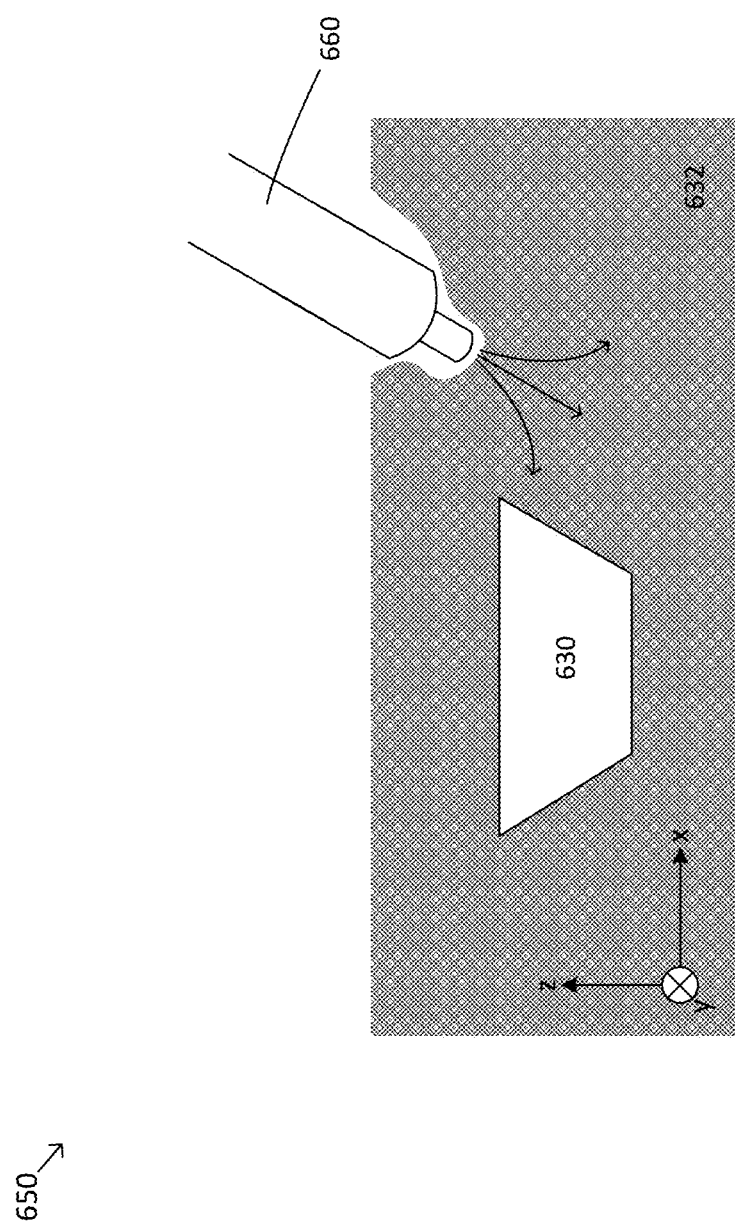
FIG. 6B depicts a depowdering system comprising a combination nozzle and vacuum device configured to rotate with respect to the surface of a powder bed, according to some embodiments.

FIG. 6B depicts a depowdering system comprising a combination nozzle and vacuum device configured to rotate with respect to the surface of a powder bed, according to some embodiments. Depowdering system 650 comprises an instance 660 of the combination nozzle and vacuum 460 shown in FIG. 4B. The cross-sectional view of FIG. 6B shows, as with FIG. 6A, the exterior of the device 660.

In the example of FIG. 6B, the combination nozzle and vacuum device 660 is configured to be rotated with respect to the powder bed 632 so that the device 660 may be operated to apply a stream of gas to the powder at an angle that is non-perpendicular to the surface of the powder bed. In particular, as per the axes shown in FIG. 6B, the device 660 may be configured to be rotatable around the y-axis and/or the x-axis. In some embodiments, the combination nozzle and vacuum device 660 may be coupled to a plurality of serial linkages, at least some of which may be actuatable by the depowdering system to produce rotation of a linkage, such as a robotic arm.

In some embodiments, the combination nozzle and vacuum device 660 may be coupled to an automated gantry configured to move the device 660 along multiple axes. In some cases, the combination nozzle and vacuum device 660 may also be coupled to one or more rotational actuators to produce rotational movement of the device in addition to motion produced by the gantry. For instance, the gantry may produce motion along the x-axis and/or y-axis, whereas said rotational actuator(s) may be configured to rotate the device around the x-axis and/or y-axis. In some cases, a container holding powder bed 632 may be configured to be rotatable by the depowdering system to produce rotation of the powder bed relative to the combination nozzle and vacuum device 660. For instance, the gantry may produce motion along the x-axis and/or y-axis, whereas the container is configured to be rotated around the x-axis and/or y-axis.

Figure 7:
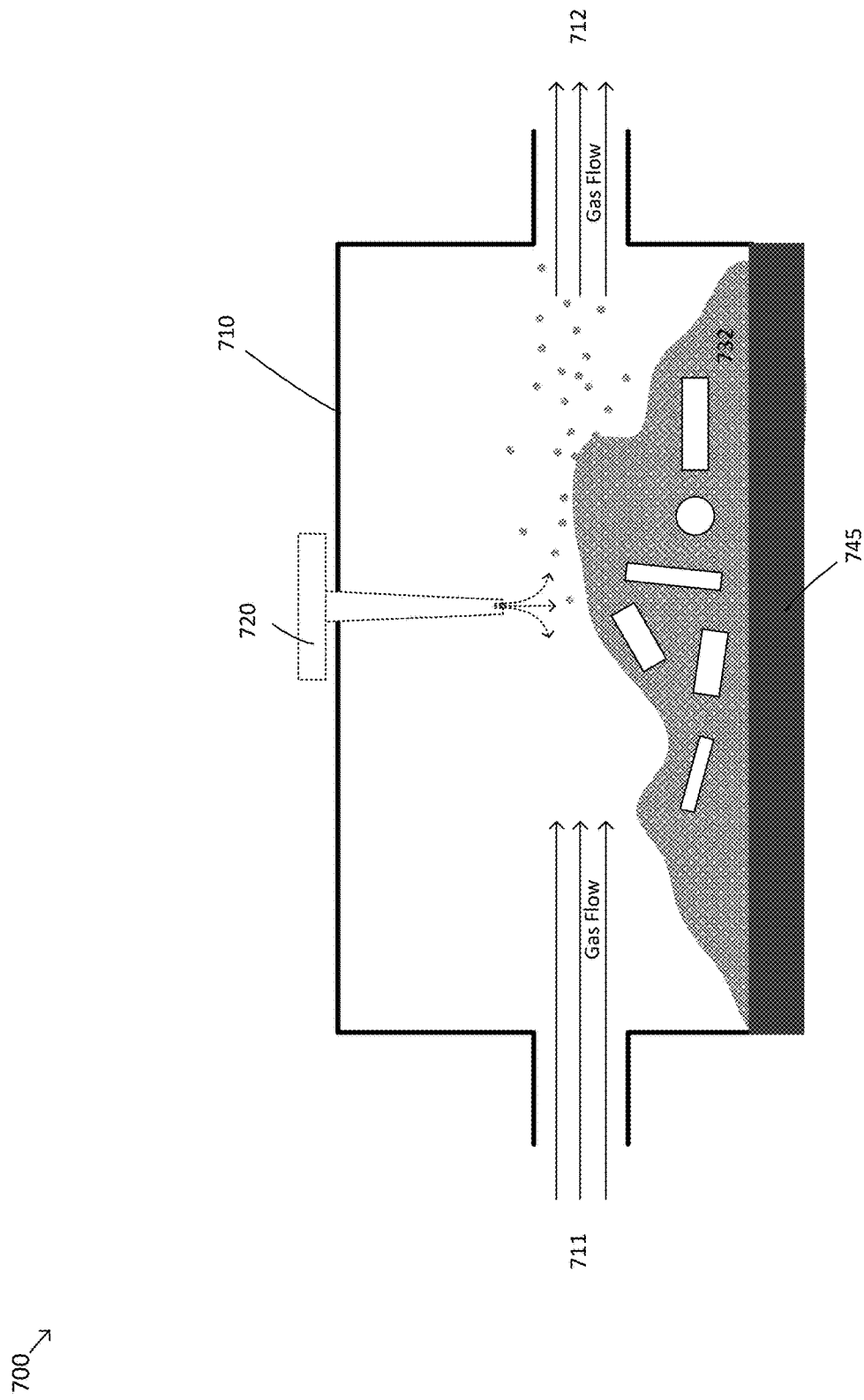
FIG. 7 depicts a depowdering system comprising a chamber through which a flow of gas may be directed, according to some embodiments.

FIG. 7 depicts a depowdering system comprising a chamber through which a flow of gas may be directed, according to some embodiments. Depowdering system 700 includes a chamber 710 having at least one inlet 711 and at least one outlet 712. At least one of the inlet and the outlet may be coupled to a source of pressure (not shown in FIG. 7) to create a pressure differential within the chamber. For instance, the source(s) of pressure may produce a comparatively higher ambient gas pressure proximate the inlet, and a comparatively lower ambient gas pressure proximate the outlet. As a result, gas may flow through the chamber toward the outlet, carrying powder from powder bed 732 with the gas and out of the chamber.

According to some embodiments, the chamber 710 may be arranged to form a seal with a surface 745. Such a seal may increase the effectiveness of the powder removal process by ensuring that the gas in the chamber flows to the outlet 712 and not through any gaps between the chamber 710 and the surface 745. A seal between the chamber and a surface may be produced via any suitable sealing device or devices, including but not limited to crush seals, gaskets, rtv caulking material, o-ring seals, bulb seals, labyrinth seals, or combinations thereof.

According to some embodiments, the surface 745 may represent an exterior surface of a build box with the powder bed 732 being an exposed portion of the full powder bed contained within the build box. For instance, FIG. 7 may represent an example of the metering process shown in FIG. 2A. In this case, a seal between the chamber and the build box may be produced by sealing the chamber around the perimeter of the build box. This approach may have an advantage that successive sections of the powder bed may be pushed into the chamber and powder removed from each section by to the gas flow in the chamber. In some cases, a continuous process of depowdering may be produced by coarse depowdering the contents of an entire build box a section at a time, eventually leaving the parts and a comparatively small amount of powder on the bottom of the build box.

According to some embodiments, the surface 745 may be a flat surface onto which the powder bed 732 has been deposited. For instance, FIG. 7 may represent an example of the metering processes shown in FIG. 2B, 2C, 2D or 2E. In this case, the chamber may be lowered onto the surface 745 subsequent to deposition of the powder bed and a seal formed between the surface and the chamber. In some cases, a process of depowdering may be produced in which a section of the powder bed is deposited from a build box onto surface 745 as per any of the examples of FIGS. 2B-2E or otherwise, then lowering the chamber onto the surface and depowdering the powder bed. Subsequently, parts on the surface 745 may be removed and another section of the powder bed deposited onto the surface from the build box as per any of the examples of FIGS. 2B-2E or otherwise.

According to some embodiments, gas flow through the chamber 710 may be produced by generating an ambient gas pressure difference between the inlet 711 and outlet 712 via any suitable means. In some cases, inlet 711 may be coupled to an ambient pressure (e.g., the air) and outlet 712 coupled to a source of comparatively low pressure such as a vacuum. In some cases, outlet 712 may be coupled to an ambient pressure (e.g., the air) and inlet 711 coupled to a source of comparatively high pressure such as an air compressor pump or a source of compressed gas. In some cases, inlet 711 may be coupled to a source of comparatively high pressure and outlet 712 coupled to a source of comparatively low pressure. The gas pressure within the chamber during operation may be above or below atmospheric pressure. Sources of pressure may be operated continuously to produce a continuous flow of gas from the inlet to the outlet within chamber 710. According to some embodiments, during operation the chamber may comprise air, although any suitable gas may be conveyed through the chamber to cause powder from the chamber to escape through the outlet 712. As one non-limiting example, the inlet may be coupled to a high pressure source of compressed air, while the outlet is coupled to the ambient environments.

While, in the example of FIG. 7, the inlet and outlet of chamber 710 are shown on the sides of the chamber, it will be appreciated that inlets and outlets may be placed at various different location within a chamber to induce particular gas flow patterns within the chamber. Moreover, the geometrical shape of chamber 710 in the example of FIG. 7 is a cuboid, although various different shapes may be envisioned to produce a particular gas flow pattern. Examples of different chamber geometries are discussed below.

According to some embodiments, the outlet 712 may be coupled to the inlet 711 of chamber 710. As such, the depowdering system may form a closed loop. In such cases, a source of moving gas, such as a blower, may be arranged within the chamber, inlet, and/or outlet to produce a pressure differential at some point within the closed loop and thereby produce circulation of gas (and powder) around the loop.

According to some embodiments, depowdering system 700 may optionally comprise one or more disruptors 720 which direct a flow of gas into the chamber and thereby disrupt powder within the powder bed 732. As described above, a flow of gas may dislodge, aerate and/or otherwise increase the flowability of regions of the powder, thereby improving the ability of the gas flowing through the chamber to carry away powder. Any of the nozzles described above in relation to FIGS. 3A, 3B, 4A, 4B, 5, 6A and 6B, and/or any other suitable nozzles may be utilized as a nozzle within disruptor 720 in the example of FIG. 7. The disruptor may in some cases protrude through the chamber so that part of the disruptor is outside of the chamber and part of the disruptor is inside the chamber. In such cases, a suitable pressure seal may be attached to the chamber to provide a seal at the entry point of the disruptor into the chamber.

According to some embodiments, disruptor 720 may be coupled to a motion system, such as a gantry configured to direct the disruptor nozzle(s) (and/or direct gas flow from the nozzle(s)) onto desired locations on the powder bed. A nozzle in a disruptor may be configured to have an gas output profile of any desired type, including a jet, a cone, a square, etc. In some cases, the disruptor may be configured to be inserted into the powder bed 732 to aerate the powder as in the example of FIGS. 3A, 3B, 4A, 4B, 5, 6A and 6B discussed above.

According to some embodiments, depowdering system 700 may comprise one or more filtration systems coupled to the outlet 712 and configured to filter particles of the powder removed from the powder bed 732. For instance, the depowdering system 700 may include a cyclone separator coupled to the outlet 712. The filtration system may be arranged so that gas exiting the chamber through the outlet may pass through the filtration system while at least some of the particles of powder carried by the gas are captured by the filtration system.

Figure 8B:
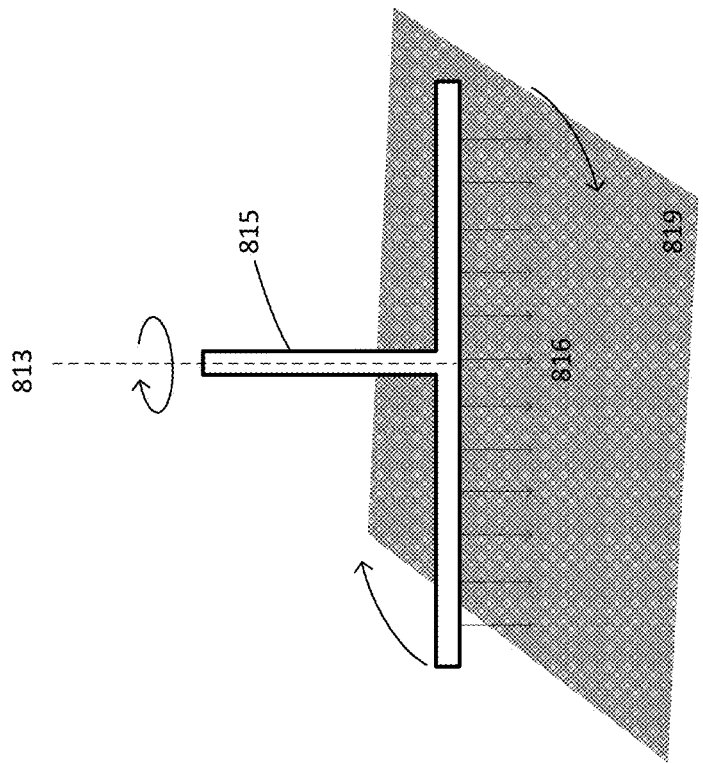
FIGS. 8A-8E depict illustrative disruptors that may be utilized in the depowdering system of FIG. 7 to aerate or otherwise disrupt powder in the powder bed, according to some embodiments.
Figure 8A:
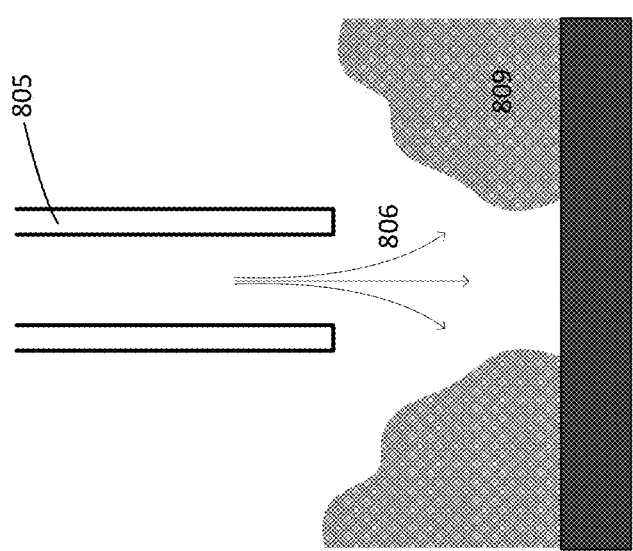

FIGS. 8A-8E depict various illustrative disruptors that may be utilized in the depowdering system of FIG. 7 to aerate or otherwise disrupt powder in the powder bed 732 and thereby aid the gas flow through the chamber in moving powder out of the chamber, according to some embodiments. Disruptor 805 shown in FIG. 8A is a comparatively simple example of a disruptor configured to direct a stream of gas 806 onto a desired part of a powder bed 809.

In the example of FIG. 8B, disruptor 815 may comprise a manifold including a plurality of nozzles that produce gas flow 816 over a linear region of the powder bed 819. The disruptor 815 may be attached to a suitable actuator configured to rotate the disruptor around axis 813 so that the linear region of the powder bed to which the gas flow is directed can be moved over the powder bed and thereby a circular region of the powder bed receives the stream of gas during a period of one revolution. According to some embodiments, the disruptor 815 may comprise a linear source of high speed gas (e.g., an air blade) as an alternative to, or additionally to, a plurality of nozzles. Nozzles of the disruptor 815 may independently have any of a variety of output profiles, including a focused jet, a fan, a cone, a square, etc. It will be appreciated that the term "air blade" refers to the structure of a high pressure gas outlet and is not limited to a device that outputs air as such a device could output any suitable gas.

Figure 8D:
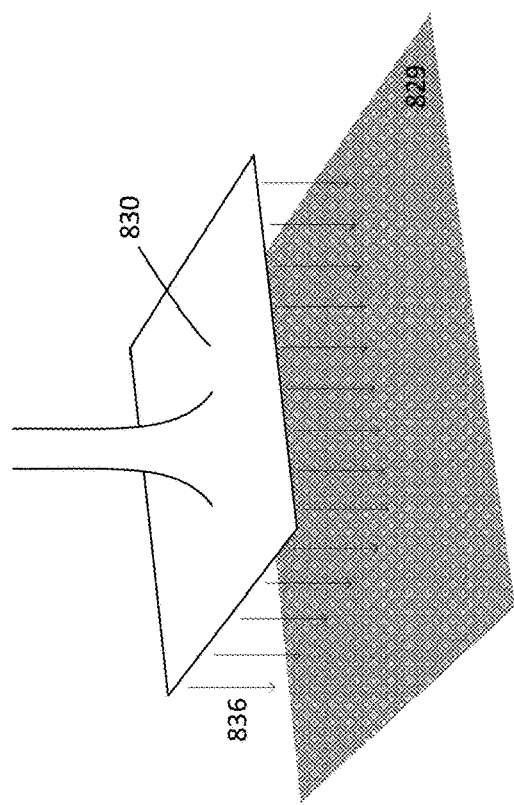
Figure 8C:
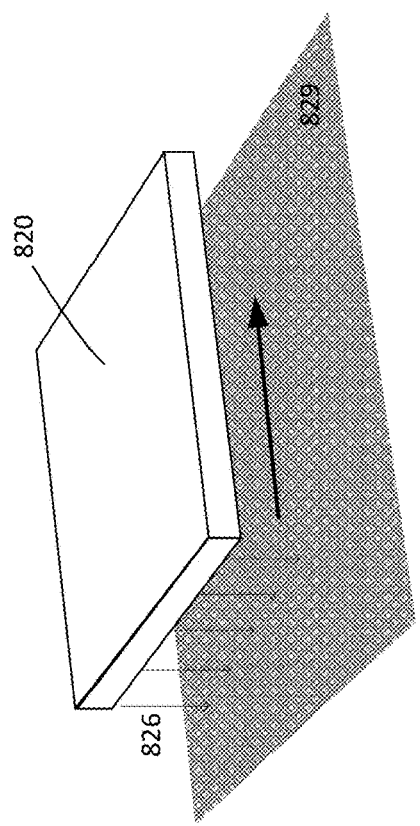

In the example of FIG. 8C, a linear source of gas flow 826 (e.g., a plurality of nozzles, an air blade, etc.) is housed within disruptor 820 and configured to move the linear source across the surface of powder bed 829. The linear source of gas flow may be controlled to direct the gas flow 826 onto any desired section of the powder bed, which may include automatically traversing the powder bed back and forth and/or being directed to different locations in a desired sequence. According to some embodiments, the linear source of gas flow comprises a plurality of nozzles, which may independently have any of a variety of output profiles, including a focused jet, a fan, a cone, a square, etc.

In the example of FIG. 8D, disruptor 830 is configured to produce an area-wise manifold of gas flow 836 onto powder bed 839. The disruptor 830 may comprise a plurality of independent source of gas flow, such as a plurality of nozzles, a plurality of air blades, etc. Nozzles of the disruptor 830 may independently have any of a variety of output profiles, including a focused jet, a fan, a cone, a square, etc.

Figure 8E:
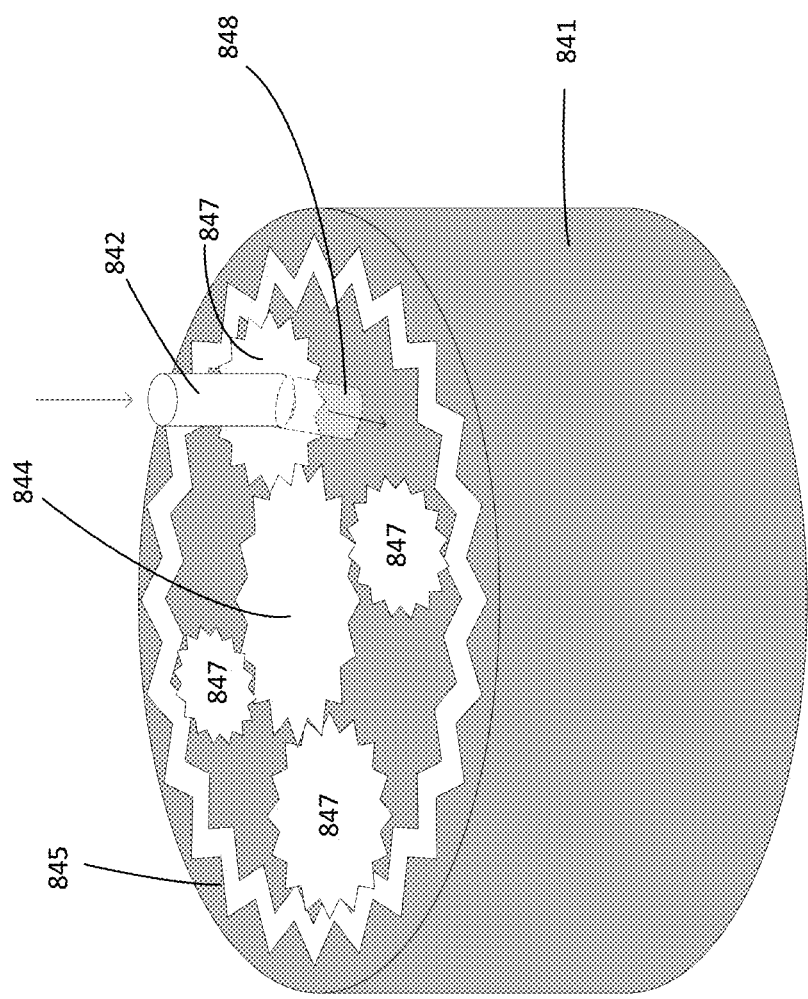

In the example of FIG. 8E, a planetary gear set, which includes center gear 844, planet gears 847 and annular gear 845, is arranged over a chamber 841. One or more gears of the planetary gear set has a gas inlet 842 disposed therethrough to supply a source of gas flow into the chamber. According to some embodiments, during operation, the center gear 844 may be held fixed and an actuator (not shown) coupled to and operated to rotate the annular gear 845. Rotation of the annular gear 845 may cause the planetary gears 847 to rotate and move in a circle around the interior of the annular gear. As a result, gas directed into the chamber through the gas inlet 842 may be directed to a plurality of locations on a powder bed disposed within the chamber. In some cases, and as illustrated in the example of FIG. 8E, the gas inlet may comprise a portion 848 that is angled with respect to the gears. This angle may cause gas flow to be directed to a greater range of locations on the powder bed in the chamber as the planet gear rotates. The gas inlet 842 may be arranged in the center of a planet gear 847.

FIGS. 9A-9H depict various illustrative chamber geometries that may be utilized as chamber 710 in the depowdering system of FIG. 7. A disruptor is illustrated in each of FIGS. 9A-9H, and it will be appreciated that this disruptor may represent any suitable disruptor or disruptors, including but not limited to those discussed above in relation to FIGS. 8A-8E. Moreover, each of the chambers illustrated in FIGS. 9A-9H may be arranged over a powder bed and a seal formed via any of the techniques described above in relation to FIG. 7 (e.g., by moving the chamber over a portion of a build box and forming a seal around the build box, by moving the chamber over a deposited mixture of powder and parts, etc.).

FIGS. 9A-9B depict top and side views, respectively, of a depowdering system 900 configured to produce linear gas flow, according to some embodiments. In the example of FIGS. 9A-9B, chamber 910 is configured to have a rectangular cross section and includes an inlet 911 and outlet 912 arranged so that during operation of the depowdering system, gas may flow upward through the inlet into the chamber and downward through the outlet from the chamber. In this respect, the inlet and outlet may include a channel portion oriented perpendicular to an interior bottom surface of the chamber 910. During operation of the depowdering system in the example of FIGS. 9A-9B, resulting gas flow through the chamber 910 over the powder bed 915 may be linear, or substantially linear. Depowdering system 900 also includes a disruptor 918 configured to aerate or otherwise disrupt powder in powder bed 915 via any of the techniques described above. Powder may be removed from the chamber by gas flowing out of the outlet 912.

FIGS. 9C-9D depict top and side views, respectively, of a depowdering system 920 configured to produce circular gas flow, according to some embodiments. In the example of FIGS. 9C-9D, chamber 930 is configured with a circular cross section and includes an inlet 931 arranged so that gas is directed tangentially into the circular chamber, thereby causing the gas to move in a circular direction around the chamber. During operation of the depowdering system 920, powder from powder bed 935 may escape the chamber through outlet 932. In this respect, the inlet and outlet may include a channel portion that meets the chamber tangentially (or otherwise at a non-perpendicular angle) to the circular interior of the chamber. During operation of the depowdering system in the example of FIGS. 9C-9D, resulting gas flow through the chamber 930 over the powder bed 935 may be circular, or substantially circular. Depowdering system 920 also includes a disruptor 938 configured to aerate or otherwise disrupt powder in powder bed 935 via any of the techniques described above.

Figure 9E:
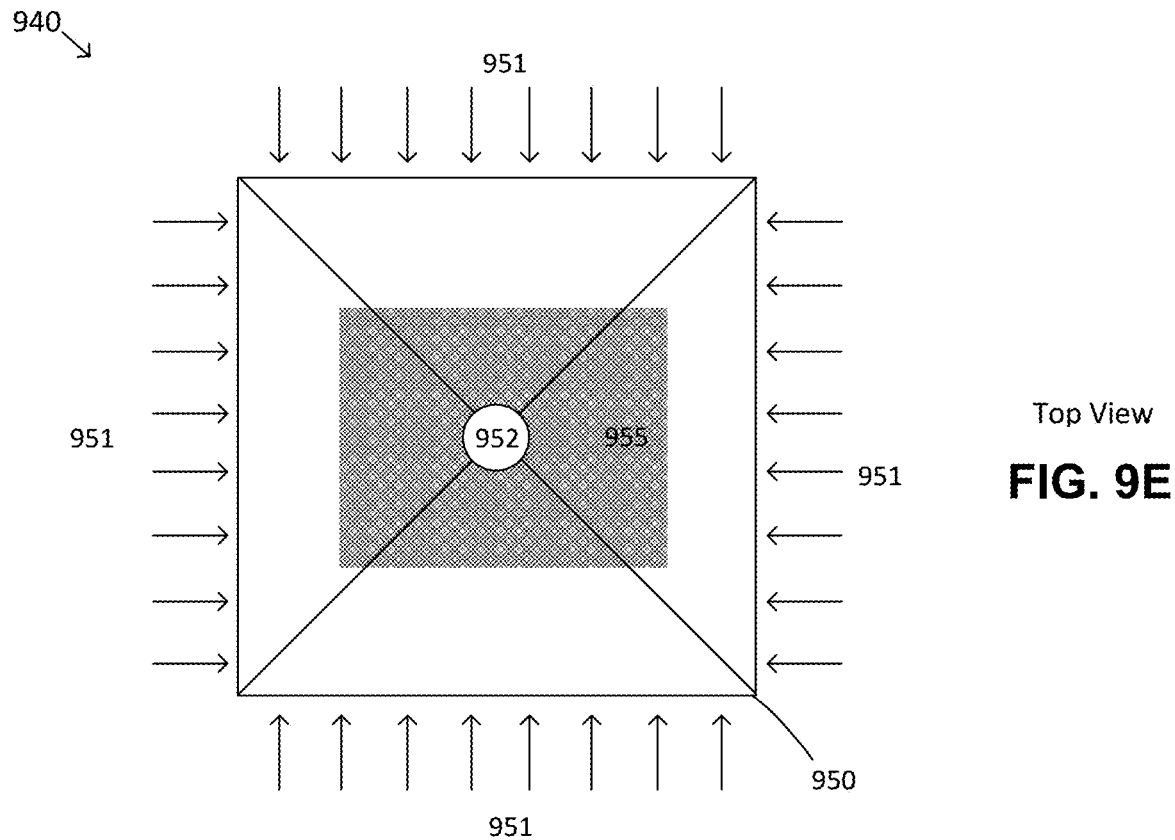
Figure 9F:
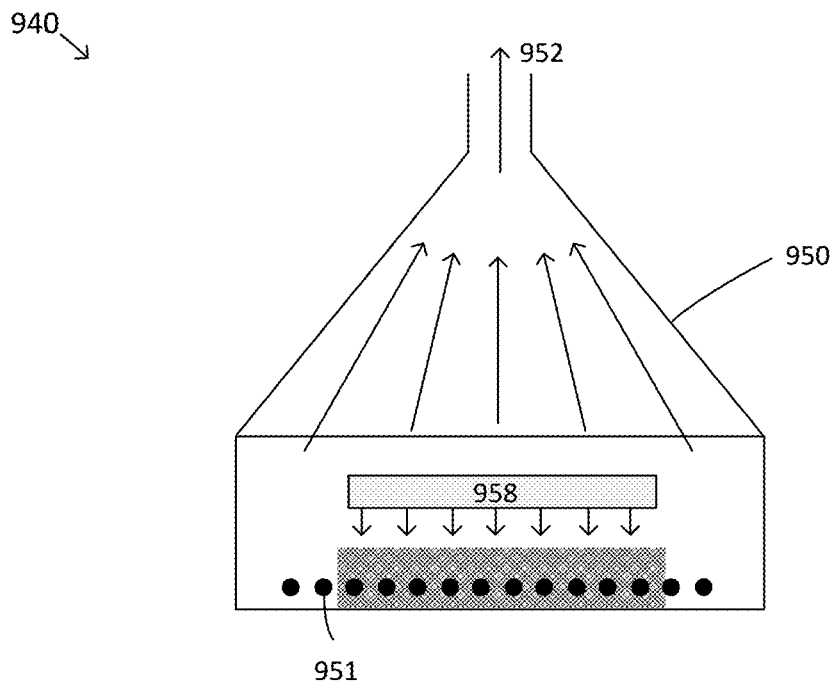

FIGS. 9E-9F depict top and side views, respectively, of a depowdering system 940 configured to produce gas flow from the bottom to the top of a chamber, according to some embodiments. In the example of FIGS. 9E-9F, chamber 950 is configured with a lower portion comprising a plurality of inlets 951 arranged on multiple sides of the chamber. The chamber also comprises an upper portion that is tapered and ends with an outlet 952 at the top of the chamber. During operation of the depowdering system 940, gas may flow through the inlets and upward within the chamber and through the outlet at the top of the chamber. As a result, powder from the powder bed 955 may be removed from the chamber by being carried upward and of the outlet 952 at the top of the chamber. Depowdering system 940 also includes a disruptor 958 configured to aerate or otherwise disrupt powder in powder bed 955 via any of the techniques described above.

Figure 9G:
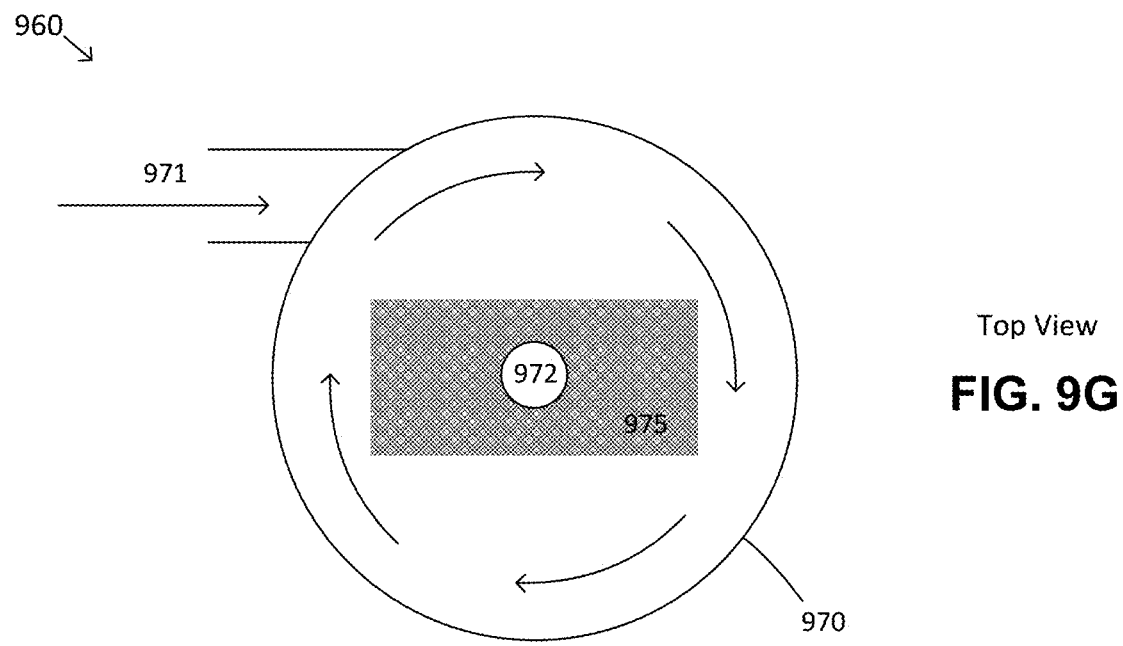
Figure 9H:
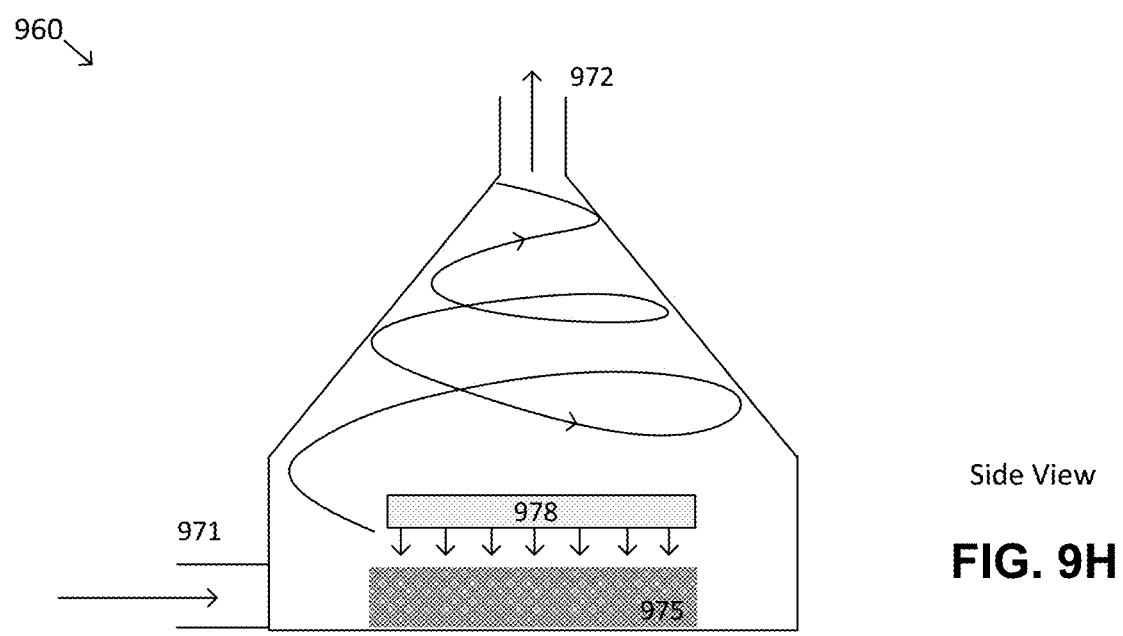

FIGS. 9G-9H depict top and side views, respectively, of a depowdering system 960 configured to produce gas flow from the bottom to the top of a chamber, according to some embodiments. In the example of FIGS. 9G-9H, chamber 970 is configured with a lower portion comprising an inlet 971 arranged so that gas is directed tangentially into the circular chamber, thereby causing the gas to move in a circular direction around the chamber. The chamber also comprises an upper portion that is tapered and ends with an outlet 972 at the top of the chamber. During operation of the depowdering system 960, gas may flow in a circular pattern and upward within the chamber and through the outlet at the top of the chamber. As a result, powder from the powder bed 975 may be removed from the chamber by being carried upward and of the outlet 972 at the top of the chamber. Depowdering system 960 also includes a disruptor 978 configured to aerate or otherwise disrupt powder in powder bed 975 via any of the techniques described above.

Figure 10A:
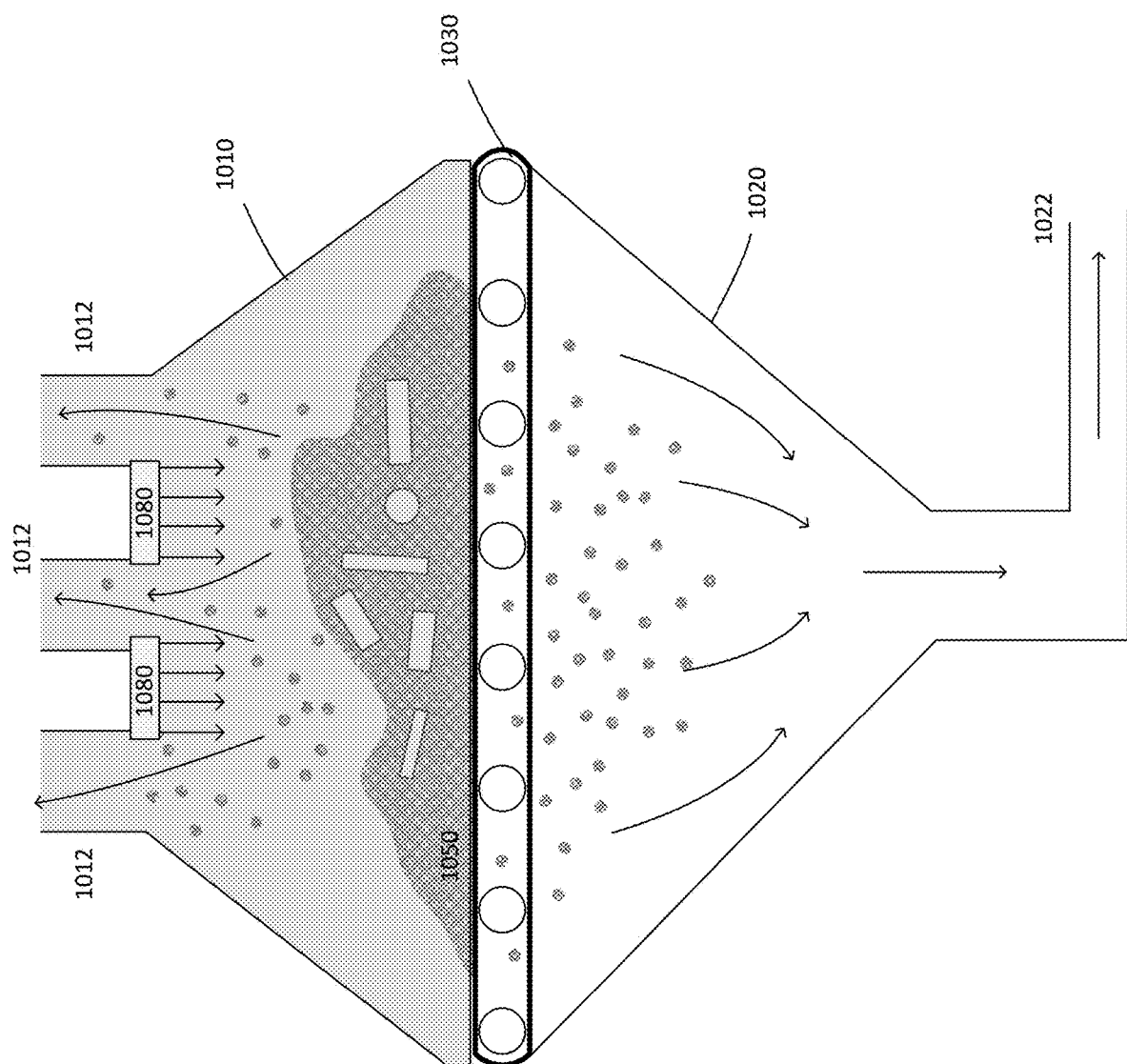

FIGS. 10A-10C depict a depowdering system configured to produce gas flow within a chamber that forms a seal around a plurality of belts, according to some embodiments. Depowdering system 1000 includes a chamber which comprises a hood portion 1010 and a lower portion 1020. Between the two portions of the chambers a plurality of belts (e.g., conveyor belts) 1030 are arranged; in the example of FIG. 10A, the belts are shown in cross-section along their length, with a number of belts extending into the page (y-direction). FIGS. 10B and 10C, to be discussed in greater detail below, show a view from the side of the view of FIG. 10A, illustrating the belts 1030 with spaces between them along the y-direction.

In the example of FIGS. 10A-10C, the hood portion of the chamber 1010 is configured to produce a seal over the belts 1030 in the following manner. The hood is configured with a comb-like pattern along the lower edges of two opposing sides which are configured to mate with the belts 1030. As shown in the sequence of FIGS. 10B-10C, the hood portion 1010 may be lowered onto the belts 1030 such that protruding portions of the comb-like pattern each fit between a respective pair of neighboring belts of the belts 1030. Thus, a seal may be formed around these sides of the hood portion, despite the belts not presenting a continuous flat surface. The other two sides of the hood portion 1010 may be flat and arranged to form a seal along the length of one of the belts 1030. Returning to FIG. 10A, therefore, it may be seen that the hood portion 1010 may be lowered over a powder bed 1050 and form a seal such that the outlets 1012 and outlet 1022 provide the only gas flow out of the chamber formed by the hood portion 1010, belts 1030 and lower portion 1020.

Moreover, in the example of FIGS. 10A-10C, disruptors 1080 are arranged within the hood portion 1010 and configured to produce a stream of gas onto the belts 1030. The upper outlets 1012 may be coupled to a source of comparatively lower pressure, such as a vacuum, as is the lower outlet 1022. As a result, during operation of the depowering system 1000, powder of the powder bed 1050 may be disrupted by the disruptors 1080 and may either be pulled upward and through the upper outlets 1012, or may fall between belts of the belts 1030 and be removed from the chamber through lower outlet 1022.

According to some embodiments, belts 1030 may be coupled to a source of vibration, such as one or more actuators, and vibrated during operation of the depowdering system 1000. Such vibration may cause powder from the powder bed to fall between belts of the belts 1030, even absent the motion of gas within the hood portion 1010. Operating the belts 1030 to vibrate may be performed at the same time as operating the sources of comparatively lower pressure coupled to outlets 1012 and 1022, or may be performed while either or both of said pressure sources are inactive.

According to some embodiments, since the depowdering system 1000 of FIGS. 10A-10C utilizes a plurality of belts as a surface on which the powder bed may rest during depowdering, a number of automated depowdering processes may be envisioned. For instance, metering techniques including any of the metering techniques of FIGS. 2B-2E may be applied to automatically deposit the powder bed onto the belts 1030, or onto another surface from which the powder bed may be transferred onto belts 1030 (e.g., onto a set of conveyor belts which may be operated to move the powder onto the belts 1030). Moreover, subsequent to depowdering the powder bed 1050, the hood portion 1010 may be raised and the belts 1030 operated to convey parts and any remaining powder to another location. Subsequently, additional powder bed material may be supplied onto the belts 1030 and additional depowdering performed.

According to some embodiments, the belts 1030 may comprise an abrasion resistant material, such as, but not limited to, polytetrafluoroethylene (PTFE), a PTFE-coated substrate, glass reinforced PTFE, Delrin, polyamides, glass reinforced polyamides, polyurethane, urethane, ethylene propylene diene terpolymer (EPDM), nitrile, butyl rubber, thermoplastic elastomers, or combinations thereof. According to some embodiments, the belts 1030 may be configured with a cross-sectional shape that inhibits powder from resting on the belts. For instance, the belts may include a wedge-shaped upper surface such that there are no flat surfaces on which powder may reside. This may aid in avoiding powder build up on the belts, which may cause abrasion of the belt material over time.

Figure 11:
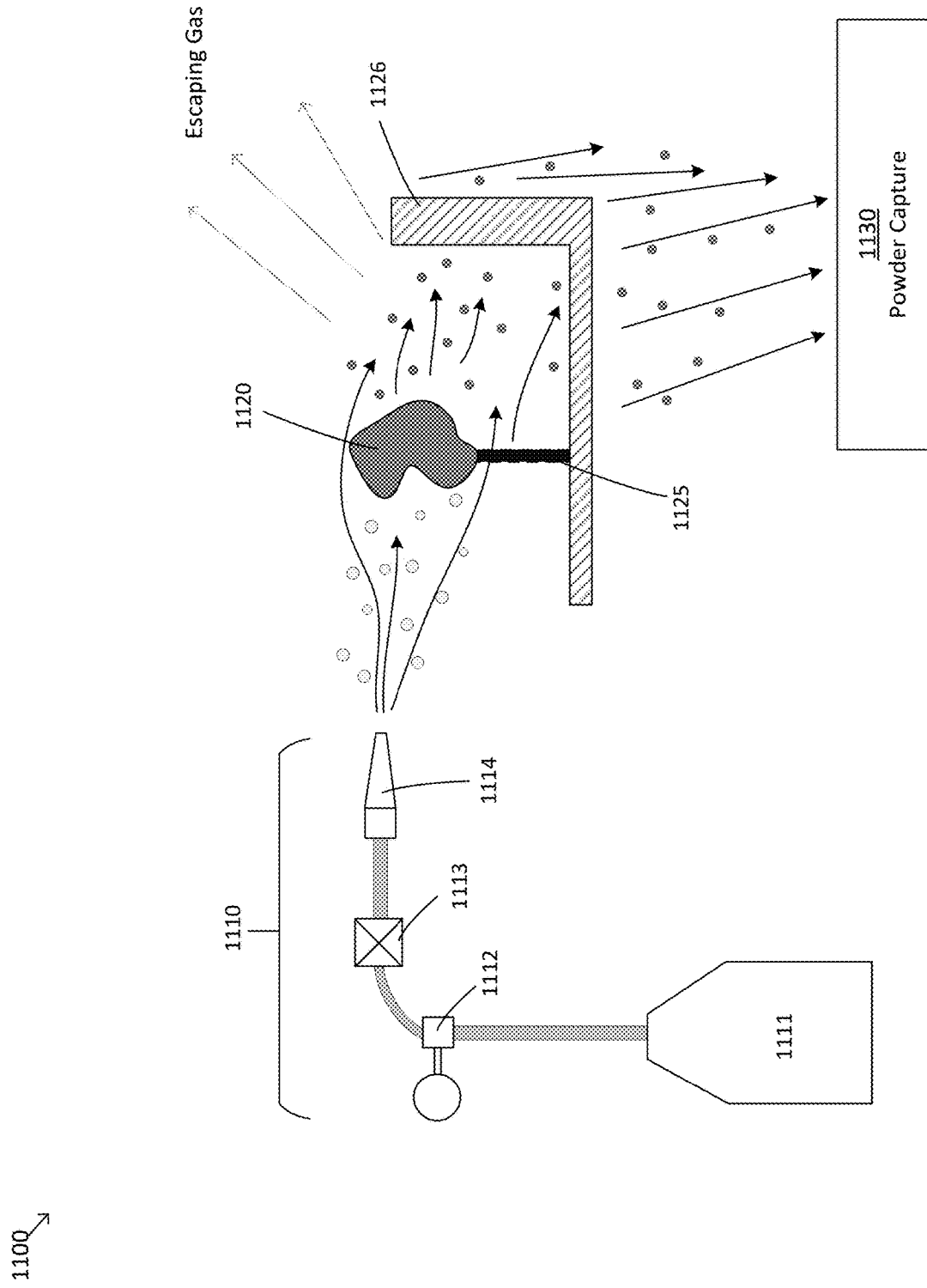
FIG. 11 depicts a depowdering system comprising a source of solid particles that may be directed onto a part to dislodge surface powder from the part, according to some embodiments.

FIG. 11 depicts a depowdering system comprising a source of solid particles that may be directed onto a part to dislodge surface powder from the part, according to some embodiments. Depowdering system 1100 comprises a source of solid particles 1110 arranged to direct said particles onto a part 1120 which is held by mount 1125. In particular, the solid particles may comprise a material that evaporates or sublimates at an ambient temperature (e.g., room temperature). The stream of solid particles may thereby collide with powder on the surface of a part, thereby dislodging powder from the part, and may additionally produce gas that carries away dislodged powder. As discussed above, this process may be considered an example of a fine depowdering process in that it is primarily focused on removing surface powder from a part already excavated from a powder bed.

In the example of FIG. 11, the source of solid particles 1110 comprises a tank of compressed liquid and/or gas 1111 which is coupled to regulator 1112. The regulator 1112 is coupled to nozzle 1114 via valve 1113. By forcing the pressurized liquid and/or gas in the tank 1111 through the orifice of nozzle 1114 a mixture of solid particles in a high velocity gas stream may be output from the nozzle. According to some embodiments, the solid particles may have an average size that is between 1 nm and 1 µm. According to some embodiments, the tank may comprise compressed liquid $CO_2$ and/or may comprise compressed $CO_2$ gas.

When the solid particles produced from the nozzle 1114 are incident upon the part 1120, they may dislodge unbound powder from the surface of the part due to momentum transfer from the solid particles and particles of the unbound particles. In addition, the high velocity stream of gas also produced from the nozzle may carry dislodged particles away from the part.

According to some embodiments, the solid particles may sublimate or evaporate at an ambient temperature of the depowdering system 1100. Sublimation of the particles may have a benefit of leaving no contaminating material on the surface of part 1120 which may occur with blasting of other types of media. In the example of solid particles of $CO_2$ for instance, solid $CO_2$ sublimates at room temperature, such that operating the depowdering system 1100 in a room temperature environment may cause all of the solid particles produced from the nozzle to sublimate to gas at some time subsequent to being output from the nozzle 1114.

In the example of FIG. 11, support 1126 may be porous, thereby allowing particles of powder dislodged from the part to fall into a powder capture device 1130. The support 1126 may, for instance, comprise a mesh, a grating or other structure containing a plurality of holes. Powder capture device 1130 may comprise any suitable container or vessel for catching powder particles removed from the part 1120.

According to some embodiments, mount 1125 may be configured to automatically move part 1120. The mount 1125 may be coupled to and/or may comprise one or more actuators that may be operated to move (translate and/or rotate) the part 1120. Such motion may be continuous while the source of solid particles 1110 directs solid particles onto part 1120, and/or may be periodic (e.g., the part may be held stationary while the source of solid particles 1110 directs solid particles onto part 1120, then moved to a new location/orientation, followed by additional direction of solid particles, etc.).

According to some embodiments, the mount 1125 may comprise elastic material to apply force to the part 1120 when the part is held in the mount. For instance, the mount may comprise a mesh or web of elastic material that stretches around the part 1120 when the part is held in the mount, and thereby applies a force to the part. As discussed above, the 1120 may have a complex shape and may be fragile. As such, a compliant material such as elastic may enable the mount to apply various magnitudes of forces to hold a wide range of parts yet without applying a high-enough force to damage such parts.

According to some embodiments, mount 1125 may be configured to magnetically attach to part 1120. Since the part 1120 may comprise a bound metal powder, a magnet may produce a force with respect to the part when placed in proximity to the part. As one example, a magnet may be attached to a piston within a cylinder. The part may be placed on one end of the cylinder and the magnet moved toward that end by actuating the piston and thereby magnetically holding the part against the cylinder and/or the magnet. In some cases, the walls of the cylinder may be sufficiently thick (e.g., thicker than the magnetic field lines of the magnet) so that the part may only be successfully held at the end of the cylinder. In some cases, the magnet may be operated to contact the part when holding the part. Alternatively, the magnet may be attached to a low-friction material (e.g., a thin piece of plastic) that contacts the magnet and the part when the mount is holding the part to ease separation of the part from the mount subsequent to depowdering.

According to some embodiments, the depowdering system 1110 may operate nozzle 1114 by moving the nozzle to direct solid particles output from the nozzle in different directions. The nozzle 1114 may be coupled to and/or may comprise one or more actuators that may be operated by the depowdering system 1110 to move (translate and/or rotate) the nozzle. Operation of the actuator(s) to move the nozzle may be performed continuously (e.g., scanning a path over the surface of the part 1120), and/or may be directed to a plurality of desired locations on the surface of the part 1120 in turn. In the case of operating the nozzle 1114 to desired locations on the surface of part 1120, such operation may be based upon the geometry of the part. For instance, certain surface shapes may tend to retain unbound powder more than other shapes. The depowdering system 1100 may be programmed to operate automatically based on such geometry and accordingly direct solid particles onto some surface regions of the part 1120 to a greater extent than other regions based on the geometry. As discussed above, such programming may be performed when slicing a model for additive fabrication or may be independently generated by the depowdering system 1100.

According to some embodiments, solid particles directed onto the part 1120 may produce liquid on the surface of the part. In some cases, the liquid may include a liquid form of the solid particles, with the solid particles having melted either on the surface of the part or during motion from the nozzle 1114 to the part 1120. In some cases, the liquid may alternatively or additionally include condensed gas from the ambient environment which may condense onto the part 1120 due to the temperature of the solid particles and/or stream of gas output from the nozzle 1114 being at a lower temperature than the ambient environment. For example, when the depowdering system 1100 is operated in an air environment, water vapor may condense onto the part 1120 when the solid particles and/or stream of gas output from the nozzle 1114 is colder than the ambient temperature.

According to some embodiments, production of liquid on the surface of part 1120 may be mitigated or avoided by utilizing a source material for the solid particles that sublimates in the ambient environment of depowdering system 1100 (thereby avoiding a liquid phase), and/or by operating the depowdering system 1100 in an inert environment that will not produce any condensation. As an example of the latter, the depowdering system 1100 may be operated within a chamber filled with an inert gas, such as argon.

Figure 12A:
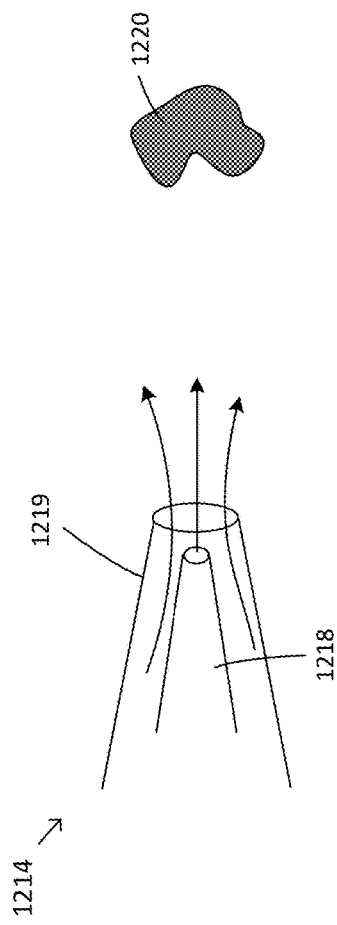
FIGS. 12A and 12B illustrate techniques for avoiding condensation on the surface of a part in the depowdering system of FIG. 11, according to some embodiments.
Figure 12B:
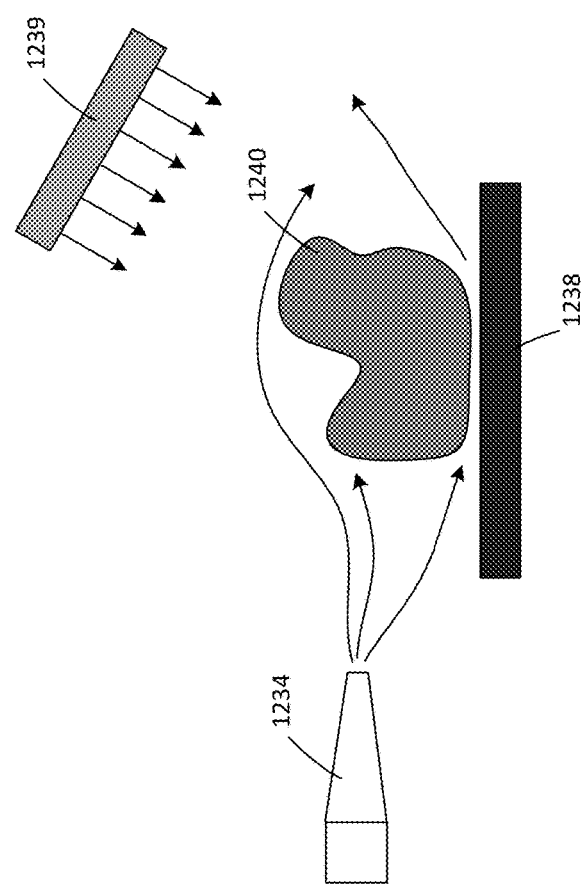

FIGS. 12A and 12B illustrate additional techniques for avoiding condensation on the surface of part 1120, according to some embodiments. In the example of FIG. 12A, the nozzle 1214 may comprise two separate concentric delivery vessels configured to direct material onto part 1220. One of vessels 1218 and 1219 may be configured to produce solid particles as described above, whereas the other vessel may be configured to output an inert gas. For instance, inner vessel 1218 may be configured to produce solid particles of a first material and outer vessel 1219 configured to produce an inert gas. The inert gas may or may not have the same chemical composition as the solid particles.

In the context of FIG. 11, by utilizing nozzle 1214 in place of nozzle 1114 to direct an inert gas onto the part from the nozzle in addition to the solid particles, condensation on the part may be avoided even if the ambient environment of the depowdering system 1100 comprises a gas that may otherwise condense onto the part during operation of the system. For example, the depowdering system 1100 may be operated in an air environment at room temperature and, using nozzle 1214, may be configured to direct solid particles of $CO_2$ onto the part 1120 in addition to a stream of an inert gas (e.g., argon).

As described above, the part being arranged in an inert environment may mitigate or avoid condensation forming on the part. According to some embodiments, with respect to the system 1100 of FIG. 11, the nozzle 1214 may be operated in system 1100 in the manner illustrated in FIG. 12A by coupling a source of pressurized gas to the nozzle in addition to the source 1110.

In the example of FIG. 12B, a nozzle 1234 is configured to direct solid particles onto a part 1240 in the same manner as described above in relation to FIG. 11 with respect to nozzle 1114 and part 1120. In the example of FIG. 12B, however, one or more sources of heat are provided to heat the part and/or the ambient environment around the part to mitigate or avoid condensation occurring through the process described above. In particular, a depowdering system may include a heater 1239 which may for instance comprise a heat gun arranged to direct heat onto the part 1240 and/or an infrared lamp arranged to direct infrared radiation toward the part 1240. In addition, or alternatively, the depowdering system may include a hot plate 1238 arranged under the part 1140 (or otherwise proximate to the part) to deliver heat to the part. In some embodiments, the depowdering system may include heater 1239 in addition to a passive heating surface arranged under the part 1140 (or otherwise proximate to the part) which comprises a material having a high capacity for thermal energy storage, thereby allowing heat from the heater that might otherwise not be directed to the part to be captured and redirected to the part.

Figure 13B:
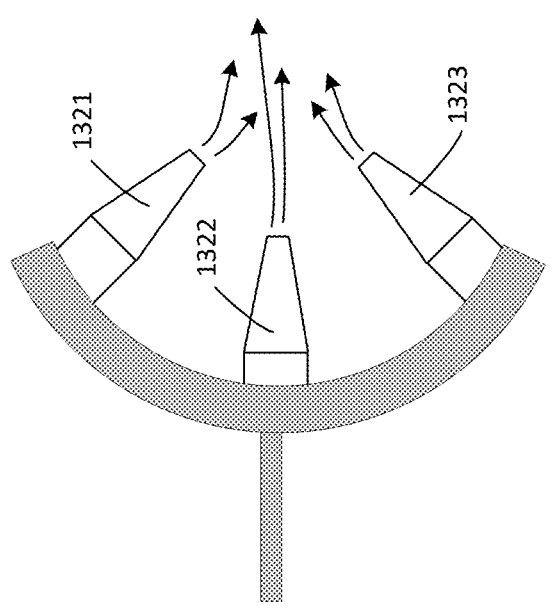
FIGS. 13A and 13B depict examples of multiple nozzle configurations in the depowdering system of FIG. 11, according to some embodiments.
Figure 13A:
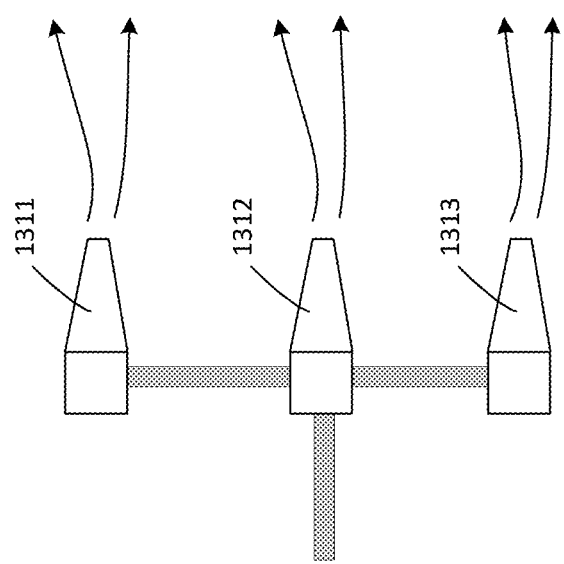

In some embodiments, a depowdering system as shown in FIG. 11 may comprise multiple nozzles in place of the single nozzle 1114. A group of nozzles may be coupled to the same source of material and thereby output substantially the same mixture of solid particles and gas, but may provide for a more desirable distribution of said solid particles and gas than may be produced by a single nozzle. FIGS. 13A and 13B depict two examples of multiple nozzle configurations, according to some embodiments.

In the example of FIG. 13A, nozzles 1311, 1312 and 1313 are arranged on a straight manifold to produce three streams of solid particles and gas in parallel directions. In the example of FIG. 13B, nozzles 1321, 1322 and 1323 are arranged on a curved manifold to produce three streams of solid particles and gas toward a common target position. The above-discussed techniques for moving nozzle 1111 may also apply to a multiple nozzle arrangement such as those shown in FIGS. 13A-13B. In such cases, the depowdering system may be configured to independently move (e.g., rotate) individual nozzles and/or the depowdering system may be configured to move the multiple nozzles as a single unit.

Figure 14A:
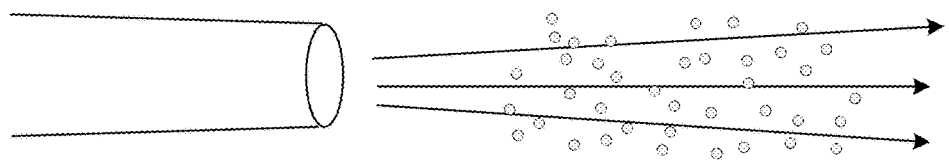
FIGS. 14A-14C depict illustrative examples of nozzle geometries that produce mixtures of solid particles and gas with different properties, according to some embodiments.
Figure 14B:
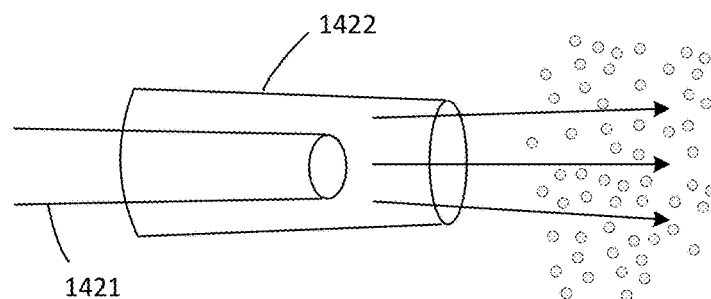
Figure 14C:
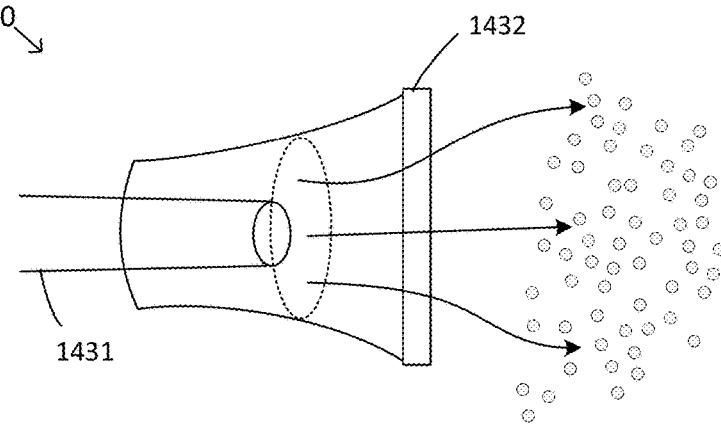

In some embodiments, nozzle 1114 of depowdering system 1100 shown in FIG. 11 may be configured with a nozzle tip arranged to produce a desired pattern of solid particles and gas. For instance, by varying the geometry of the nozzle tip, the velocity of the solid particles and gas, the density of solid particles produced, and/or the area over which the solid particles are produced may be adjusted. FIGS. 14A-14C depict three illustrative examples of nozzle geometries that adjust such properties of the mixture of solid particles and gas produced by the nozzle, according to some embodiments.

In the example of FIG. 14A, a nozzle which has a simple geometry is illustrated for purposes of comparison with the nozzle configurations of FIGS. 14B and 14C. The nozzle 1410 may be expected to produce solid particles and gas with a comparatively high velocity, with a comparatively lower density of solid particles, over a comparatively small area. Nozzle 1420 shown in FIG. 14B includes a tip section 1421 with a linear sheath portion 1422 arranged over the end of the tip section 1421. The tip section 1421 delivers a mixture of solid particles and gas into the interior of the sheath portion 1422 and motion of the mixture within the sheath causes the properties of the mixture to be different from that of nozzle 1410 when it leaves the nozzle 1420. In comparison with nozzle 1410, nozzle 1420 may be expected to produce solid particles and gas with a comparatively lower velocity, with a comparatively higher density of solid particles, over a greater area than nozzle 1410.

Nozzle 1430 shown in FIG. 14C includes a tip section 1431 with a curved sheath portion 1432 arranged over the end of the tip section 1431. In particular, the sheath portion 1432 has a first end that is narrower than the second end, the second end being configured to output the mixture of solid particles and gas emitted from the nozzle 1431. Moreover, the sheath portion 1432 has a linear opening at the second end, and has a more circular cross sectional shape proximate to the end of the tip section 1431. In comparison with nozzle 1410, nozzle 1430 may be expected to produce solid particles and gas with a comparatively lower velocity, with a comparatively higher density of solid particles, and over a greater area than both nozzle 1410 and nozzle 1420.

FIG. 15A depicts a robotic control system coupled to a nozzle in a depowdering system, according to some embodiments. As discussed above, nozzle 1114 shown in FIG. 11 may be configured to be moved to direct solid particles output from the nozzle in different directions. Robotic arm 1510 is one illustrative example of a suitable motion system for moving a nozzle. The robotic arm 1510 includes a nozzle 1511 and is configured with three rotational actuators 1521, 1522 and 1523 which may be operated by control unit 1520 to position and orient the nozzle 1511 to a desired location in three-dimensional space.

FIG. 15B depicts a handheld device comprising a nozzle for a depowdering system, according to some embodiments. Device 1540 includes a nozzle 1541 and is coupled to a source of pressurized liquid and/or gas via hose 1545. The body portion 1543 is configured to be held in a user's hand and manually directed to portions of the surface of a part. In this manner, the depowdering system 1100 shown in FIG. 11 may be operated with a manual motion provided to the nozzle 1114. Trigger 1542 opens and closes one or more valves within the body portion 1543 to activate and deactivate production of solid particles and gas from the device.

Figure 16:
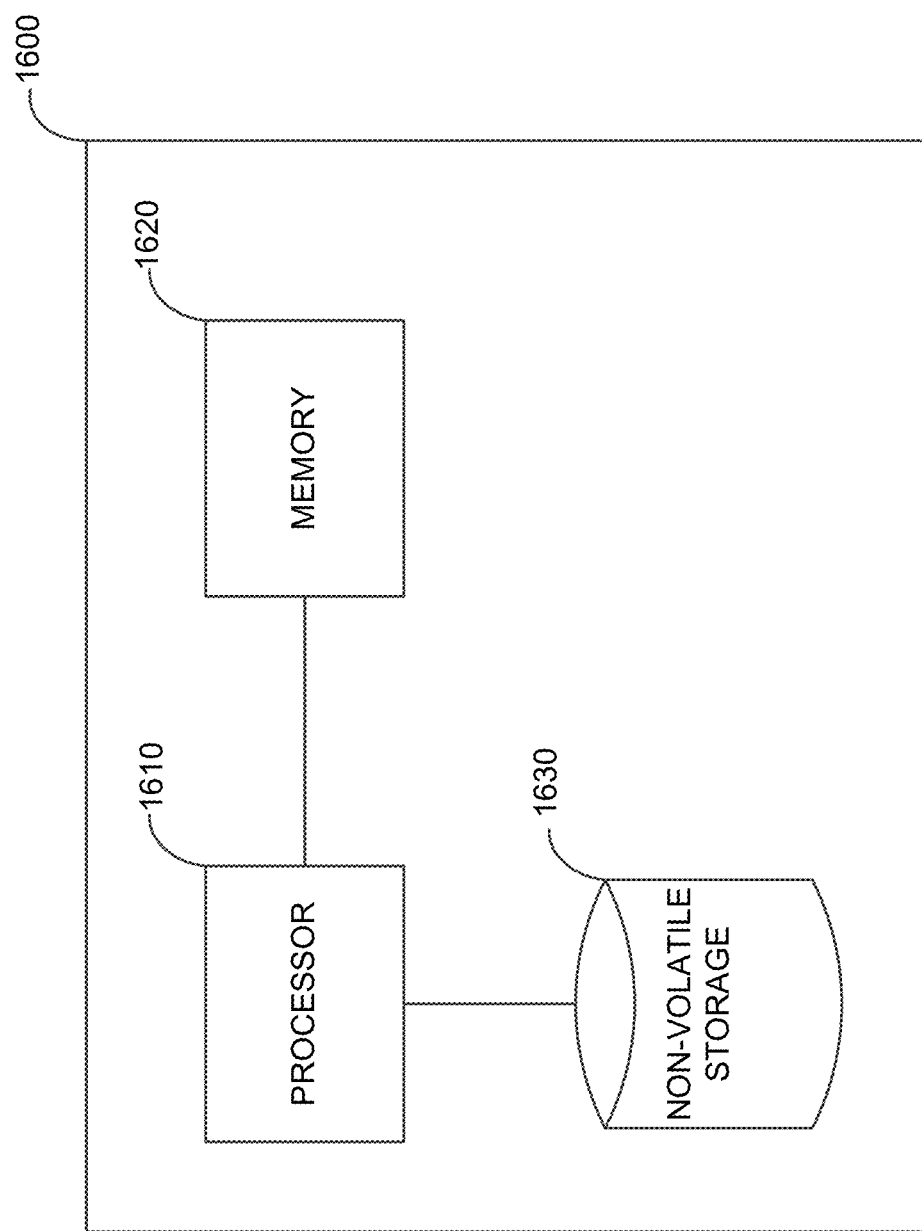
FIG. 16 illustrates an example of a computing system environment on which aspects of the invention may be implemented.

An illustrative implementation of a computer system 1600 that may be used to perform any of the techniques described above is shown in FIG. 16. The computer system 1600 may include one or more processors 1610 and one or more non-transitory computer-readable storage media (e.g., memory 1620 and one or more non-volatile storage media 1630). The processor 1610 may control writing data to and reading data from the memory 1620 and the non-volatile storage device 1630 in any suitable manner, as the aspects of the invention described herein are not limited in this respect. To perform functionality and/or techniques described herein, the processor 1610 may execute one or more instructions stored in one or more computer-readable storage media (e.g., the memory 1620, storage media, etc.), which may serve as non-transitory computer-readable storage media storing instructions for execution by the processor 1610.

In connection with techniques described herein, code used to, for example, generate instructions that, when executed, cause an additive fabrication device to fabricate one or more parts, cause a depowdering system to automatically perform depowdering operations (e.g., metering a powder bed, activating/deactivating a pressure source, etc.) may be stored on one or more computer-readable storage media of computer system 1600. Processor 1610 may execute any such code to perform any of the above-described techniques as described herein. Any other software, programs or instructions described herein may also be stored and executed by computer system 1600. It will be appreciated that computer code may be applied to any aspects of methods and techniques described herein. For example, computer code may be applied to interact with an operating system to transmit instructions to an additive fabrication device or depowdering system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture)

or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for extracting one or more additively fabricated parts from a powder bed comprising a powder and the one or more additively fabricated parts, the method comprising:
   inserting at least part of the powder bed into a chamber, the chamber comprising one or more inlets and one or more outlets, wherein the one or more inlets comprise one or more openings into the chamber;
   forming a hermetic seal around the at least part of the powder bed;
   directing, using one or more nozzles, one or more jets of gas onto a surface of the powder bed within the chamber; and
   producing, concurrently with said directing the one or more jets of gas onto the surface of the powder, a continuous flow of gas through the chamber from the one or more inlets to the one or more outlets such that powder from the powder bed is transported through at least some of the one or more outlets.

2. The method of claim 1, wherein the powder bed is held within a build box, and wherein forming the hermetic seal around the at least part of the powder bed comprises forming the hermetic seal around the build box.

3. The method of claim 1, wherein the powder bed comprises a metal powder and wherein the one or more additively fabricated parts comprise particles of the metal powder and at least one binding agent.

4. The method of claim 1, wherein a vacuum is coupled to the one or more outlets to, at least in part, produce the continuous flow of gas through the chamber.

5. The method of claim 1, further comprising moving the one or more nozzles relative to the surface of the powder bed while directing the one or more jets of gas onto the surface of the powder bed.

6. The method of claim 5, wherein the one or more nozzles are part of a movable structure and moving the one or more nozzles relative to the surface of the powder bed comprises moving the movable structure over the surface of the powder bed.

7. The method of claim 1, wherein the one or more inlets pass through one or more planet gears of a planetary gear train.

8. The method of claim 1, further comprising raising the powder bed and thereby pushing additional parts of the powder bed into the chamber.

9. The method of claim 1, wherein the one or more jets of gas directed using the one or more nozzles comprises air.

10. The method of claim 1, wherein the continuous flow of gas comprises a continuous flow of air.

11. The method of claim 1, wherein the one or more inlets are part of a closed loop with the one or more outlets.

12. The method of claim 1, wherein the one or more inlets includes a first inlet, wherein the one or more outlets includes a first outlet, and wherein the first inlet is arranged on an opposing side of the chamber from the first outlet.

13. The method of claim 5, further comprising moving at least part of the one or more nozzles into the powder bed while directing the one or more jets of gas into the powder bed.

14. The method of claim 1, wherein the continuous flow of gas through the chamber from the one or more inlets to the one or more outlets generates an ambient pressure difference within the chamber between the one or more inlets and the one or more outlets.

* * * * *